(12) United States Patent
Nojiri et al.

(10) Patent No.: US 12,298,191 B2
(45) Date of Patent: *May 13, 2025

(54) GAS DETECTION DEVICE, GAS DETECTION METHOD, AND DEVICE COMPRISING GAS DETECTION DEVICE

(71) Applicant: SEMITEC Corporation, Tokyo (JP)

(72) Inventors: Toshiyuki Nojiri, Tokyo (JP); Dezhi Cheng, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 17/772,509

(22) PCT Filed: Oct. 16, 2020

(86) PCT No.: PCT/JP2020/039088
§ 371 (c)(1),
(2) Date: Apr. 27, 2022

(87) PCT Pub. No.: WO2021/085182
PCT Pub. Date: May 6, 2021

(65) Prior Publication Data
US 2022/0341864 A1   Oct. 27, 2022

(30) Foreign Application Priority Data

Nov. 1, 2019   (JP) ................. 2019-199959

(51) Int. Cl.
*G01K 7/24* (2006.01)
*G01N 25/18* (2006.01)
*G01N 27/12* (2006.01)

(52) U.S. Cl.
CPC ............ *G01K 7/24* (2013.01); *G01N 25/18* (2013.01); *G01N 27/12* (2013.01)

(58) Field of Classification Search
CPC ........... G01N 25/18; G01N 27/12–124; G01K 7/22–25
See application file for complete search history.

(56) References Cited

U.S. PATENT DOCUMENTS

| 7,329,389 B2* | 2/2008 | Horovitz ............... G01N 27/16 422/50 |
| 11,452,953 B2* | 9/2022 | Svensson ............... F16N 39/06 |
| 11,531,013 B2* | 12/2022 | Nojiri .................. G01N 27/125 |

FOREIGN PATENT DOCUMENTS

| JP | H05312619 A | * 11/1993 |
| JP | 2885661 | 4/1999 |

(Continued)

OTHER PUBLICATIONS

"International Search Report (Form PCT/ISA/210) of PCT/JP2020/039088," mailed on Dec. 22, 2020, with English translation thereof, pp. 1-4.

*Primary Examiner* — Justin N Olamit
(74) *Attorney, Agent, or Firm* — JCIPRNET

(57) ABSTRACT

Provided are a gas detection device, a gas detection method, and a device including the gas detection device that are capable of enhancing responsiveness, gas detection sensitivity, and gas detection accuracy. A gas detection device (10) with a thermal-conductivity-type gas sensor (1) includes a connection circuit including a thermistor (2) having at least a pair of electrode parts (22a) and a resistor (11) connected to the thermistor (2); a power supply circuit (Ep) for applying a constant voltage to the connection circuit and putting the thermistor (2) in a thermal runaway state by supplying excess power to the thermistor (2); and a voltage detection unit for detecting a voltage between the electrodes of the thermistor (2) in the connection circuit.

6 Claims, 16 Drawing Sheets

(56) References Cited

FOREIGN PATENT DOCUMENTS

| JP | 3343801 | 11/2002 | | |
|----|---------|---------|---|---|
| JP | 5079723 | 11/2012 | | |
| JP | 2016031335 | 3/2016 | | |
| JP | 2017036936 | 2/2017 | | |
| JP | 6160667 | 7/2017 | | |
| WO | 2017145889 | 8/2017 | | |
| WO | WO-2017145889 A1 * | 8/2017 | ............ | G01N 25/48 |
| WO | 2019031260 | 2/2019 | | |

* cited by examiner

TEMPERATURE DEPENDENCE OF THERMAL CONDUCTIVITY OF GAS

| INTERNATIONAL STANDARD | MAIN COMPOSITION OF DRY AIR | | 0°C | 100°C | 200°C | 300°C |
|---|---|---|---|---|---|---|
| MAIN COMPONENT | CHEMICAL FORMULA | VOLUME RATIO (vol%) | THERMAL CONDUCTIVITY [W/m K] | THERMAL CONDUCTIVITY [W/m K] | THERMAL CONDUCTIVITY [W/m K] | THERMAL CONDUCTIVITY [W/m K] |
| NITROGEN | $N_2$ | 78.084000 | 0.0241 | 0.0313 | 0.0381 | 0.0414 |
| CARBON DIOXIDE | $CO_2$ | 0.039000 | 0.0145 | 0.0222 | 0.0306 | 0.0399 |
| HYDROGEN | $H_2$ | 0.000050 | 0.1675 | 0.2140 | 0.2570 | 0.2954 |
| WATER VAPOR | $H_2O$ | — | | 0.0241 | 0.0317 | 0.0399 |

# GAS DETECTION DEVICE, GAS DETECTION METHOD, AND DEVICE COMPRISING GAS DETECTION DEVICE

CROSS-REFERENCE TO RELATED APPLICATION

This application is a 371 application of the international PCT application serial no. PCT/JP2020/039088, filed on Oct. 16, 2020, which claims the priority benefits of Japan application no. 2019-199959, filed on Nov. 1, 2019. The entirety of the above-mentioned patent application is hereby incorporated by reference herein and made a part of this specification.

TECHNICAL FIELD

The present invention relates to a gas detection device, a gas detection method, and a device including the gas detection device.

BACKGROUND ART

Conventionally, for example, a gas sensor is used to detect humidity or a specific gas in home appliances, OA equipment, food storage equipment, medical equipment, transportation equipment such as automobiles, and the like.

In such gas sensors, a thermal-conductivity-type gas sensor is known as a proven type suitable for detection of a high concentration gas (refer to Patent Literature 1 to 4). A thermal-conductivity-type gas sensor utilizes the property that a thermal conductivity of an atmosphere differs depending on types and concentrations of gases therein.

However, in a thermal-conductivity-type gas sensor, although a minute output voltage can be obtained, a problem that the detection sensitivity is low may occur.

Meanwhile, the applicant has proposed a gas sensor that detects a concentration of a specific gas using a porous gas molecule adsorption material that is thermally coupled to a thermosensitive resistance element and desorbs specific gas molecules by heating (refer to Patent Literature 5 and 6).

CITATION LIST

Patent Literature

Patent Literature 1: Japanese Patent No. 2885661
Patent Literature 2: Japanese Patent No. 3343801
Patent Literature 3: Japanese Patent No. 5079723
Patent Literature 4: Japanese Patent No. 6160667
Patent Literature 5: PCT International Publication No. WO 2017/145889
Patent Literature 6: PCT International Publication No. WO2019/031260

SUMMARY OF INVENTION

Technical Problem

However, since a gas sensor using a porous gas molecule adsorption material has a configuration in which the gas molecule adsorption material is thermally coupled to the thermosensitive resistance element, there is a problem in that a heat capacity of the gas sensor itself increases and responsiveness decreases.

Further, in the porous gas molecule adsorption material, gas molecules are desorbed from and adsorbed by the gas molecule adsorption material by heating and cooling, but in a cooled state, a phenomenon in which water vapor gas (water molecules) in the atmosphere is adsorbed by the gas molecule adsorption material may occur. Thus, in the detection of a specific gas, a fluctuation is caused in an output level (an output level in the cooled state) used as a reference, and a problem that gas detection accuracy deteriorates occurs.

On the other hand, it is desired to realize a high sensitivity gas detection device that takes advantage of characteristics of both a thermal-conductivity-type gas sensor and a gas sensor that detects a specific gas using a porous gas molecule adsorption material.

An embodiment of the present invention is for solving this problem in the case in which the porous gas molecule adsorption material is used, and an objective thereof is to provide a gas detection device, a gas detection method, and a device comprising the gas detection device capable of enhancing responsiveness and gas detection sensitivity and improving gas detection accuracy.

Further, another objective thereof is to provide a complex high-sensitivity gas detection device, a gas detection method, and a device comprising the gas detection device that takes advantage of the characteristics of both a thermal-conductivity-type gas sensor and a gas sensor that detects a specific gas using a porous gas molecule adsorption material.

Solution to Problem

A gas detection device according to an embodiment of the present invention is a gas detection device with a thermal-conductivity-type gas sensor, including a connection circuit having a thermistor having at least a pair of electrode parts and a resistor connected to the thermistor, a power supply circuit for applying a constant voltage to the connection circuit and supplying an excess power to the thermistor to put the thermistor in a thermal runaway state, and a voltage detection unit configured to detect a voltage between electrodes of the thermistor in the connection circuit.

The heat conduction type gas sensor is a gas sensor that detects a change in a heat dissipation state of the thermistor as a temperature change according to a thermal conductivity specific to a gas in the atmosphere and detects the temperature change as a resistance change of the thermistor.

The thermal runaway of the thermistor is a physical phenomenon peculiar to the thermistor, and in general, since the thermistor may be damaged due to thermal runaway, it is recommended to use the thermistor under conditions in which a thermal runaway does not occur.

Further, a device equipped with the gas detection device according to the embodiment is characterized in that a gas detection device is provided.

The device equipped with the gas detection device can be provided and applied to various devices for detecting gas molecules and humidity, such as medical equipment, automobiles, home appliances, OA equipment, food storage equipment and the like. The equipment to which it is specifically applied is not limited.

Further, a gas detection method according to an embodiment is a gas detection method of a thermal-conductivity-type gas sensor with a thermistor, including a step of supplying an excess power to the thermistor to put the thermistor in a thermal runaway state, and a step of detecting a detection target gas in the thermal runaway state.

Further, a gas detection method according to an embodiment is a gas detection method of a gas sensor which includes a porous gas molecule adsorption material that is thermally coupled to a thermistor and desorbs specific gas molecules by heating, and which supplies an excess power to the thermistor to put the thermistor in a thermal runaway state, wherein a function of detecting a gas by a reaction of desorption of specific gas molecules from the gas molecule adsorbed material and a function as a thermal-conductivity-type gas sensor that detects a gas according to a heat conductivity peculiar to the gas are selectable by changing an applied voltage of the thermistor.

Advantageous Effects of Invention

According to the embodiment of the present invention, it is possible to provide a gas detection device, a gas detection method, and an apparatus comprising the gas detection device capable of enhancing responsiveness and gas detection sensitivity and improving gas detection accuracy.

Further, it is possible to provide a complex high-sensitivity gas detection device, a gas detection method, and a device comprising the gas detection device that takes advantage of characteristics of both a thermal-conductivity-type gas sensor and a gas sensor that detects a specific gas using a porous gas molecule adsorption material.

DESCRIPTION OF EMBODIMENTS

First Embodiment

Figure 1:
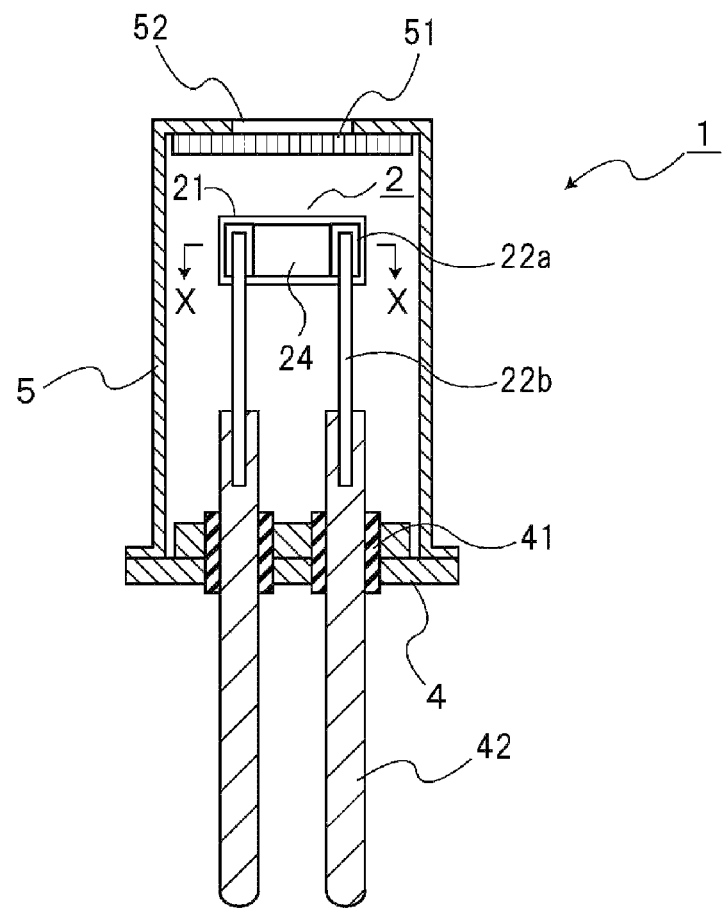
FIG. 1 is a cross-sectional view showing a thermal-conductivity-type gas sensor according to a first embodiment of the present invention.
Figure 2:
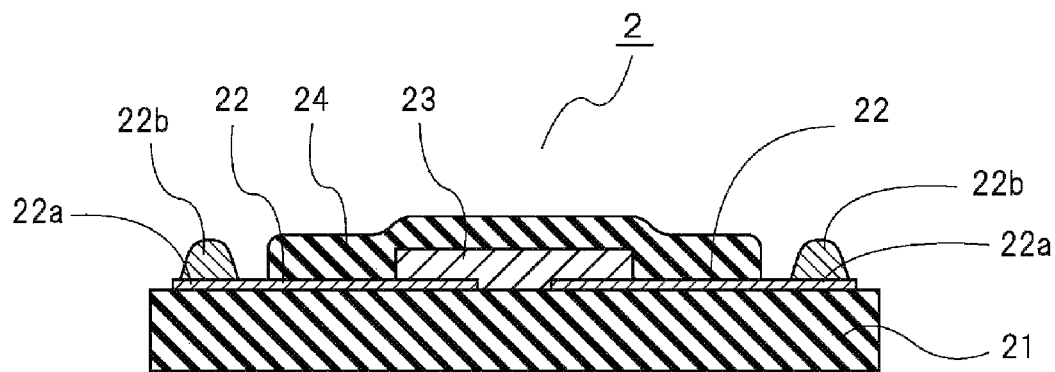
FIG. 2 is a cross-sectional view taken along line X-X in FIG. 1.
Figure 3:
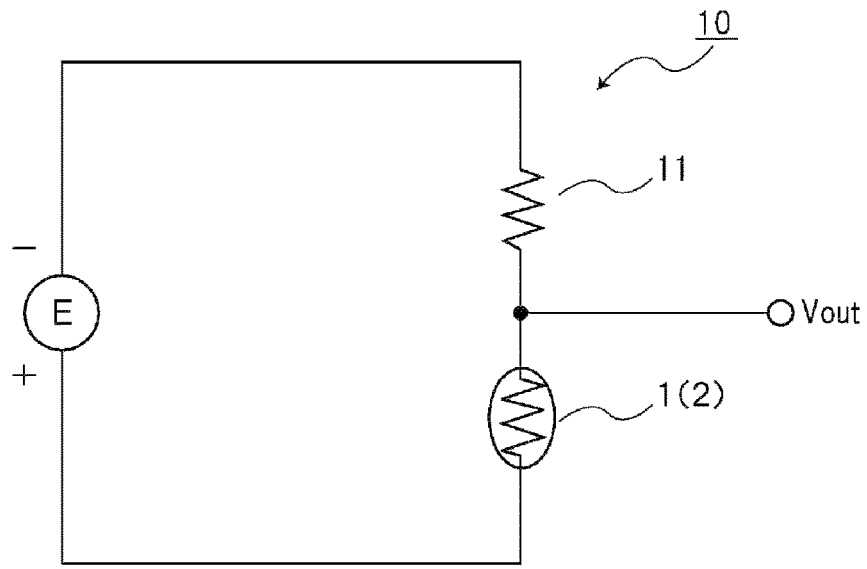
FIG. 3 is a wiring diagram for characteristic detection of the gas detection device.
Figure 4:
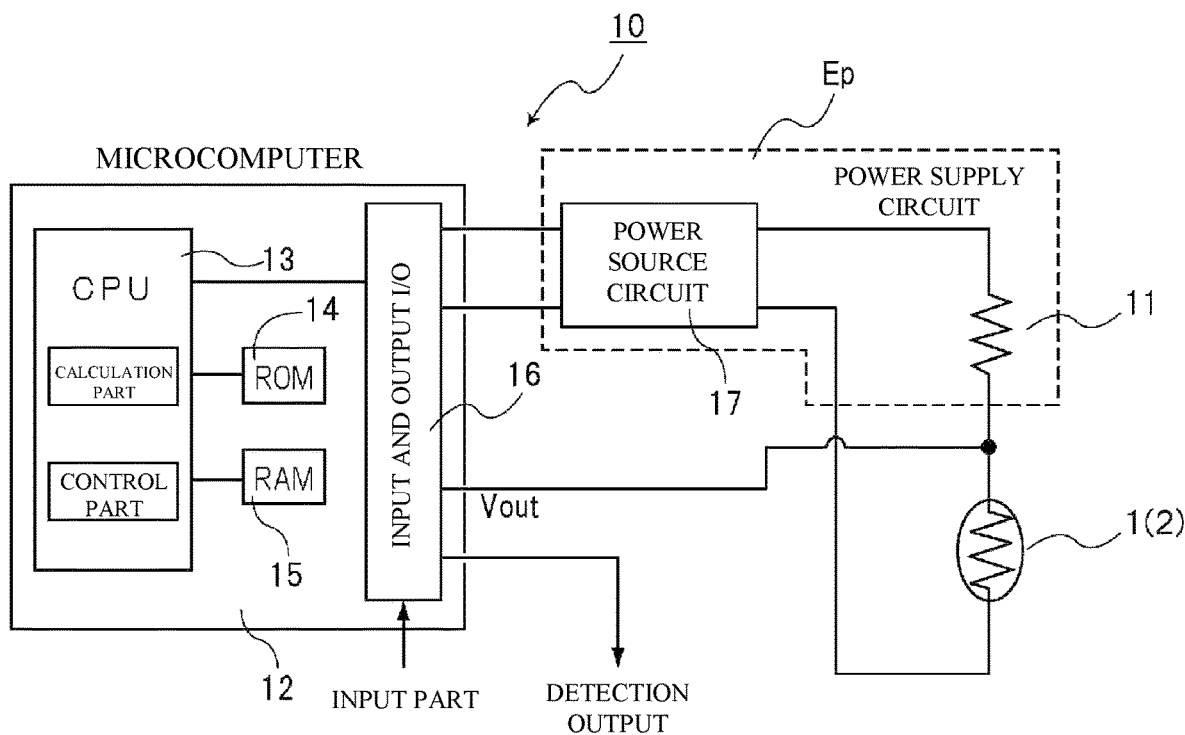
FIG. 4 is a block configuration diagram showing the gas detection device.
Figure 5:
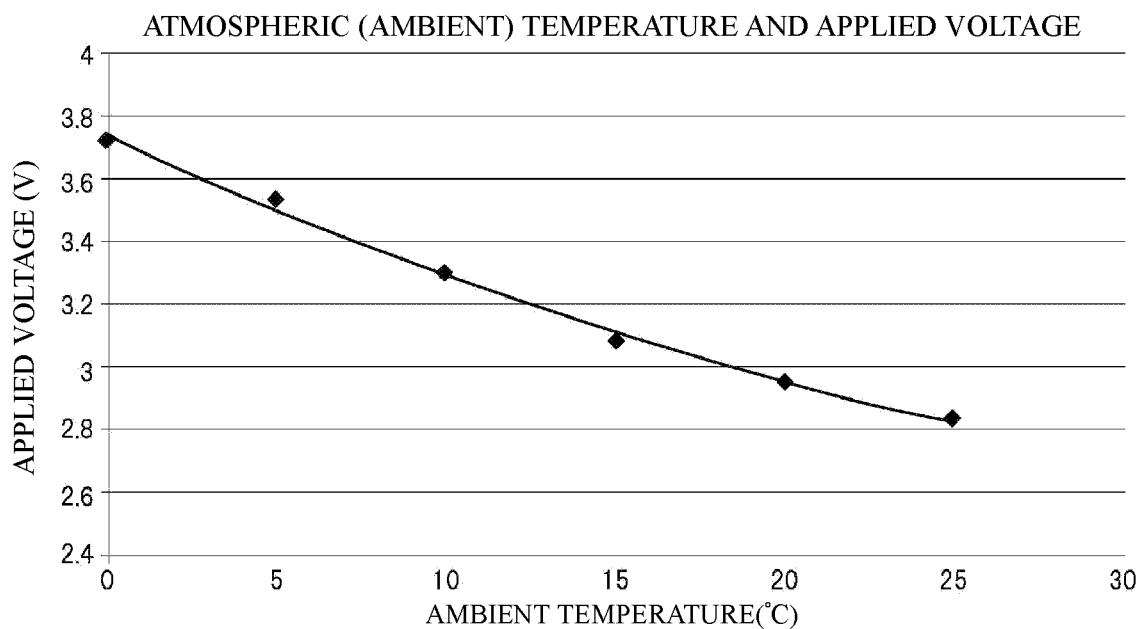
FIG. 5 is a graph showing a relationship between an atmospheric temperature and a applied voltage.

Hereinafter, a gas detection device and a gas detection method according to a first embodiment of the present invention will be described with reference to FIGS. 1 to 12. FIGS. 1 and 2 are cross-sectional views showing a thermal-conductivity-type gas sensor, FIG. 3 is a schematic circuit diagram for characteristic detection of a gas detection device showing a basic configuration of the present invention, FIG. 4 is a block configuration diagram showing the gas detection device, and FIG. 5 is a graph showing a relationship between an atmospheric temperature and an applied voltage. Further, FIGS. 6 to 12 are graphs and tables for describing output characteristics of the gas detection device.

The gas detection device of the present embodiment uses a thermal-conductivity-type gas sensor that detects a type and a concentration of a gas using a property that heat conductivities of atmospheres are different from each other. This thermal-conductivity-type gas sensor is equipped with a thermistor, detects a change in a heat dissipation state of the thermistor as a temperature change according to a thermal conductivity peculiar to a gas in the atmosphere, and detects the temperature change as a resistance change of the thermistor. Further, the gas detection device is characterized in that an excess power is supplied, specifically, an overvoltage is applied to the thermistor to put the thermistor in a thermal runaway state and to increase gas detection sensitivity.

(Thermal-Conductivity-Type Gas Sensor)

As shown in FIGS. 1 and 2, the thermal-conductivity-type gas sensor 1 includes a thermistor 2 as a thermosensitive resistance element, a base member 4, and an exterior case 5. The thermal-conductivity-type gas sensor 1 is a sensor that detects water vapor ($H_2O$) gas (water molecules), carbon dioxide ($CO_2$) gas, and the like in the atmosphere. In each of the drawings, a scale of each of the members is appropriately changed in order to make each of the members recognizable.

The thermistor 2 is a thin film thermistor and is a detection thermistor. The thermistor 2 includes a substrate 21, and a conductive layer 22, a thin film element layer 23, and a protective insulating layer 24 formed on the substrate 21.

The substrate 21 has a substantially rectangular shape and is formed of an insulating ceramic such as alumina, aluminum nitride, or zirconia, or a semiconductor material such as silicon or germanium. An insulating thin film is formed on one surface of the substrate 21 by a sputtering method. Specifically, the substrate 21 is made of an alumina material, is extremely thin and has a thickness dimension of 50 μm to 150 μm.

It is possible to realize the thermal-conductivity-type gas sensor 1 having a small heat capacity, high sensitivity, and excellent heat responsiveness by using such an extremely thin substrate 21 for the thermistor 2.

The conductive layer 22 constitutes a wiring pattern and is formed on the substrate 21. The conductive layer 22 is formed by forming a metal thin film by a sputtering method, and noble metals such as platinum (Pt), gold (Au), silver (Ag), and palladium (Pd) and alloys thereof, for example, Ag—Pd alloys are applied as a metal material thereof. Further, a pair of electrode parts 22a electrically connected to the conductive layer 22 are formed integrally with the conductive layer 22 at both ends of the substrate 21.

The thin film element layer 23 is a thermistor composition and is configured of an oxide semiconductor having a negative temperature coefficient. The thin film element layer 23 is formed on the conductive layer 22 by a sputtering method or the like and is electrically connected to the conductive layer 22. The thin film element layer may be configured of an oxide semiconductor having a positive temperature coefficient. Further, the thermistor is not limited to a thin film thermistor and may be a thermistor element configured of a semiconductor such as a metal oxide, a silicide, or a nitride.

The thin film element layer 23 is configured of two or more elements selected from transition metal elements such as manganese (Mn), nickel (Ni), cobalt (Co), and iron (Fe). The protective insulating layer 24 is formed to cover the thin film element layer 23 and the conductive layer 22. The protective insulating layer 24 is a protective glass layer formed of borosilicate glass.

Further, a lead part 22b made of a metal material is joined and electrically connected to the electrode part 22a by welding. Specifically, the lead part 22b is formed of a material having a low thermal conductivity such as constantan or Hastelloy (registered trademark), and the thermal conductivity is preferably 5 W/m·K to 25 W/m·K. These parts are connected in a welded state by laser welding. Therefore, the metals of the electrode part 22a and the lead part 22b are mutually melted and joined. Therefore, since there is no additional material such as a filler metal (a brazing material) used for soldering or the like, that is, there are no inclusions between the electrode part 22a and the lead part 22b, a heat capacity can be reduced, a thermal time constant can be reduced, and thus thermal responsiveness of the thermistor 2 can be increased. For the lead part 22b, a linear body having a circular cross section or a narrow plate-shaped body having a frame shape can be used. The form of the lead part 22b is not particularly limited. When the lead part 22b is a linear body, it has a diameter of 30 μm to φ100 μm, and when it has a foil shape having a narrow plate-like body and has a lead frame shape, it is preferable that a width dimension be 80 to 200 μm and a thickness dimension be 10 μm to 60 μm. Further, it is desirable that a cross-sectional area of the lead part 22b be 0.001 mm² to 0.03 mm².

In this way, when a material that has a thermal conductivity of 5 W/m·K to 25 W/m·K and is weldable is selected as a material of the lead part 22b and a cross-sectional area of the lead part 22b is set to 0.001 mm² to 0.03 mm², a heat capacity and an amount of heat dissipation of the thermistor 2 according to the lead part 22b can be reduced, and the thermal-conductivity-type gas sensor 1 having high sensitivity and excellent heat responsiveness can be realized. In particular, when a foil-like material is used for the lead part, the effect thereof is further improved. Further, since the lead part 22b is connected to the thermistor 2 in a welded state, durability can be ensured in a phenomenon of thermal runaway due to an excess power.

The base member 4 is a metal member formed in a substantially disk shape, and a conductive terminal part 42 is inserted therethrough with an insulating member 41 interposed therebetween. The lead part 22b derived from the thermistor 2 is electrically connected to the conductive terminal part 42 by welding, soldering, or the like. The insulating member 41 is made of an insulating material such as glass or resin.

When the base member 4 is made of an insulating material, the insulating member 41 can be eliminated. Further, the conductive terminal part 42 may be configured of a printed wiring board or the like.

The exterior case 5 is a metal member having a substantially cylindrical shape and having good thermal conductivity, and a circular opening 52 in which one end side is open and a ventilation part 51 is formed on the other end side is formed therein. One end side of the exterior case 5 is mounted on the base member 4 to cover and protect the thermistor 2.

The ventilation part 51 is made of a breathable member that reduces an influence of outside airflow and allows gas to flow in and out, and is preferably made of a material such as a wire mesh, a non-woven fabric, or a porous sponge. The ventilation part 51 is provided by press-fitting or adhering to the inner peripheral side of the exterior case 5. Further, the ventilation part 51 is not limited to the case in which the ventilation part 51 is provided in the exterior case 5. The ventilation part 5 may be provided on the base member 4, or a gap may be formed between the exterior case 5 and the base member 4 and then the ventilation part 5 may be provided in this gap.

The exterior case 5 can be made of a ceramic, a resin material or the like. In this case, metal plating or the like may be applied so that an inner wall surface of the exterior case 5 has a function of reflecting infrared rays.

(Gas Detection Device)

As shown in FIG. 3, a gas detection device 10 is configured by connecting a power supply (a voltage source) E to the thermal-conductivity-type gas sensor 1. Specifically, a fixed resistor as a limiting resistor 11 and the thermal-conductivity-type gas sensor 1 (the thermistor 2) are connected in series to the power supply E to form a connection circuit, an output terminal is connected to a portion between the limiting resistor 11 and the thermistor 2, and a sensor voltage $V_{out}$ is detected using a voltage of the output terminal as a voltage applied to a sensor.

The detection of the sensor voltage $V_{out}$ as the voltage between the electrodes of the thermistor 2 in the connection circuit is performed by a voltage detection unit (not shown). This voltage detection unit may have, for example, a function of receiving an output from an output terminal and detecting the output as the sensor voltage $V_{out}$, includes functional parts and members such as an electronic circuit part, and is not limited to a particularly specific part or member. Of course, a current between the electrodes of the thermistor 2 in the connection circuit may be detected.

The limiting resistor 11 is a resistor for limiting a current flowing through the circuit when the thermistor 2 is in a thermal runaway state.

In the thermal-conductivity-type gas sensor 1 of the present embodiment as described above, the metal lead part 22b was joined to the electrode part 22a of the thermistor 2 by welding, and a gas sensor of a comparative example in which a metal lead part is joined to an electrode part by soldering was used, and output characteristics of both the thermal-conductivity-type gas sensor 1 of the present embodiment and the gas sensor of the comparative example were compared and measured.

As a result, it was found that the gas sensors of the comparative example had a large variation in the output characteristics of the individual gas sensors as compared with the thermal-conductivity-type gas sensor 1 of the present embodiment. It is considered that this is because, in the case of the gas sensor of the comparative example, an inclusion as a filler material (a brazing material) is present between the electrode part and the lead part, and quantitative variation of this inclusion is likely to occur, which affects the variation in the output characteristics.

Therefore, since the thermal-conductivity-type gas sensor 1 of the present embodiment does not have an inclusion like the gas sensor of the comparative example, it is possible to suppress variation in the output characteristics of the individual thermal-conductivity-type gas sensors 1 and to improve reliability.

Next, the gas detection device 10 will be specifically described with reference to FIG. 4. In the present embodiment, a microcomputer 12 which is a control means performs overall control. The microcomputer 12 is roughly configured of a CPU 13 having a calculation part and a control part, a ROM 14 and a RAM 15 as storage means, and an input and output control means 16. Additionally, a power supply circuit 17 is connected to the input and output control means 16. Further, the circuit shown in FIG. 3 is connected to the power supply circuit 17.

The power supply circuit 17 includes the power supply E and has a function of applying the voltage of the power supply E to the thermistor 2 and controlling supply of power to the thermistor 2. Specifically, the power supplied from the power supply E in the power supply circuit 17 is controlled by a program stored in the storage means of the microcomputer 12. Further, the sensor voltage $V_{out}$ is input to the microcomputer 12, is calculation-processed and is then output to a detection output part O/P as a detection output. The detection output part O/P is a display means or a printing means. Further, an input part I/P is connected to the input and output control means 16. The input part I/P is an input means such as a keyboard and can perform setting by inputting information such as a voltage value and a time as needed.

In the present embodiment, the power supplying from the power supply E is performed by, for example, a means configured of the microcomputer 12 or the power supply circuit 17. This means may have a function of supplying electric power to the gas sensor 1, specifically, a function of supplying electric power from the power supply E to the thermistor 2 and is not particularly limited to a specific member or part.

Further, the gas detection device 10 is configured to supply an excess power to the thin film thermistor of the thermistor 2 to put the thermistor 2 in a thermal runaway state and to detect a concentration of a specific gas (a detection target gas).

Thermal runaway is a phenomenon that, when a constant voltage is applied to the thermistor and a rating is not kept to, the temperature increases sharply, the current continues to increase, and the thermistor is damaged. That is, in the thermal runaway state, when a voltage is applied to the thermistor, self-heating occurs, and a thermal equilibrium temperature is achieved according to the ambient temperature, but in the case in which a rated voltage is exceeded and there is an overvoltage, this becomes a phenomenon that occurs in a region in which damage to the characteristics may occur. A large detection output can be obtained using such a thermal runaway state, and thus detection sensitivity of the detection target gas can be increased.

Specifically, in order to supply an excess power to the thin film thermistor of the thermistor 2 to put the thermistor 2 in the thermal runaway state, a power supply circuit Ep configured of the power supply circuit 17 and the limiting resistor 11 is provided. For example, the voltage applied to the thermistor 2 is adjusted by selecting a constant voltage applied by the power supply circuit 17 and a resistance value of the limiting resistor 11, and an overvoltage is applied so that the thermistor 2 is in the thermal runaway state.

Therefore, the thermistor 2 can be put into the thermal runaway state by controlling the constant voltage applied to the connection circuit between the limiting resistor 11 and the thermistor 2 and the resistance value of the limiting resistor 11 with the power supply circuit 17 of the power supply circuit Ep.

Further, the thermal runaway state of the thermistor 2 is managed so that the thermistor 2 is not destroyed. That is, the thermistor 2 causes the phenomenon of the thermal runaway state, but it does not lead to destruction due to this phenomenon.

The power supply circuit Ep connected to the thermistor 2 limits the current flowing through the thermistor 2 to a predetermined current value in the thermal runaway state, and this limitation is mainly performed by controlling the resistance value of the limiting resistor 11.

Therefore, the thermistor 2 is managed so as not to lead to destruction by connection elements such as the power supply E and the limiting resistor 11 in the power supply circuit Ep connected to the thermistor 2. The power supply circuit Ep has a function as a thermal runaway management function part that manages the thermistor 2 so as not to lead to destruction, and the thermistor 2 causes the phenomenon of the thermal runaway state, but the destruction thereof is prevented.

(Carbon Dioxide Gas Detection)

Next, an operation of the gas detection device 10 will be described with reference to FIGS. 5 to 7. In this embodiment, a case in which the detection target gas is carbon dioxide ($CO_2$) gas is shown. For example, it is an example of detecting carbon dioxide ($CO_2$) gas in a refrigerator.

First, FIG. 5 shows a relationship between the atmospheric (ambient) temperature and the applied voltage of the thermistor. A horizontal axis shows the ambient temperature (° C.), and a vertical axis shows the applied voltage (V). It shows measurement data when the thermistor 2 is put into the thermal runaway state by applying a constant voltage corresponding to the ambient temperature of the thermal-conductivity-type gas sensor 1.

From this measurement data, it can be seen that the thermal runaway state can be easily controlled by controlling the applied voltage so that the applied voltage decreases as the ambient temperature increases. For example, when the ambient temperature is 10° C., the thermistor 2 can be put into the thermal runaway state by applying a voltage of about 3.3 V. Therefore, stable detection is possible by applying a voltage corresponding to the ambient temperature to the thermistor 2 and putting the thermistor 2 in the thermal runaway state.

In this case, a thermosensitive resistance element for temperature detection can be provided to detect the ambient temperature and to determine the voltage applied to the thermistor 2. Specifically, the thermosensitive resistance element for temperature detection is mounted in the thermal-conductivity-type gas sensor 1, that is, the above-described thermistor 2 and thermosensitive resistance element for temperature detection are disposed in the exterior case 5 of the thermal-conductivity-type gas sensor 1. A structure similar to that shown in FIG. 14 which will be described later can be adopted.

Figure 6:
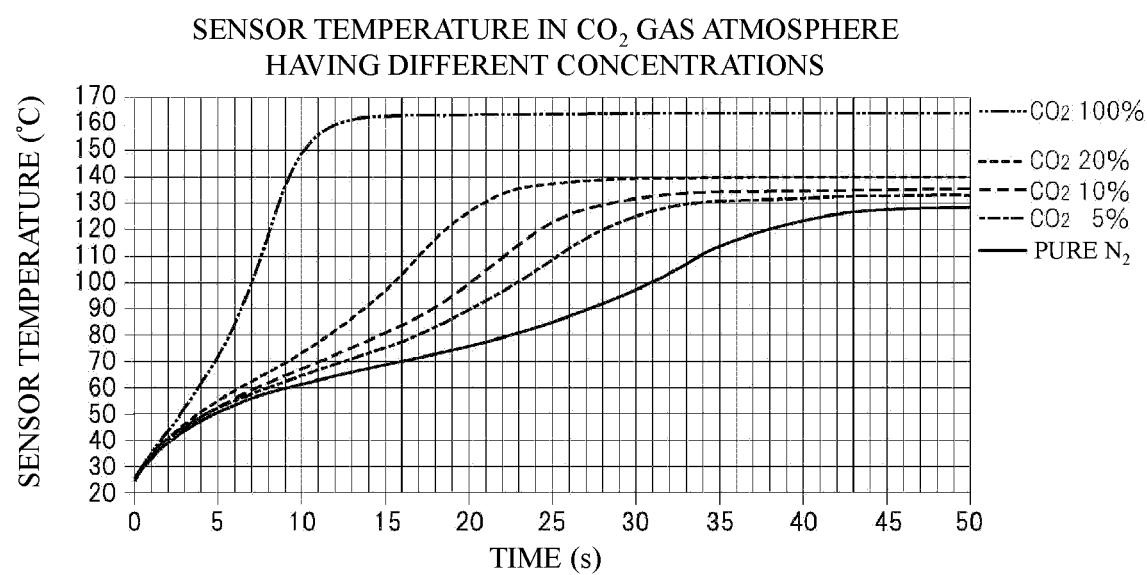
FIG. 6 is measurement results for describing output characteristics of the gas detection device and is a graph showing a sensor temperature in carbon dioxide gas atmospheres having different concentrations.
Figures 7, 8:
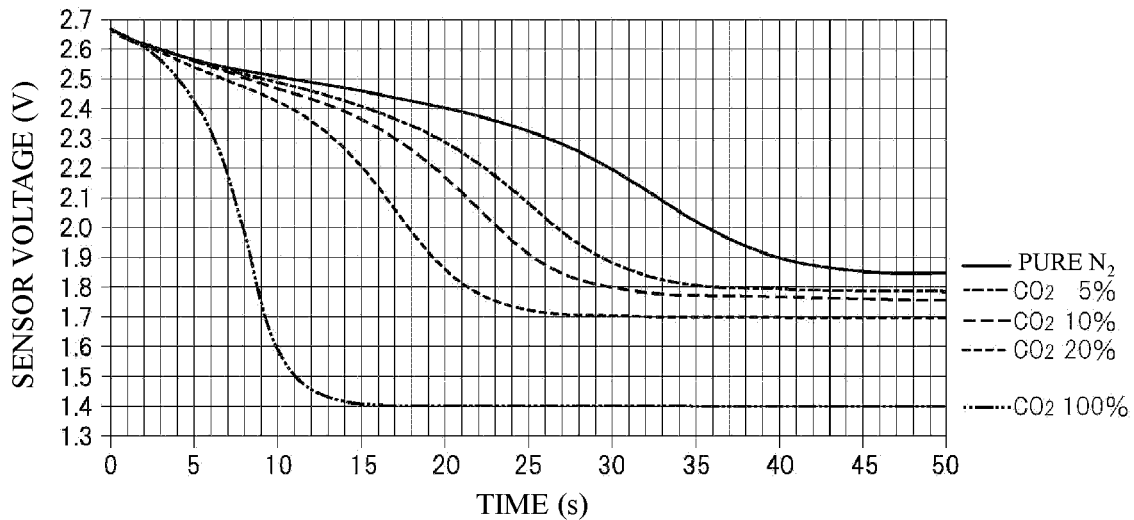
FIG. 7 is a graph showing sensor voltages in carbon dioxide gas atmospheres having different concentrations.
FIG. 8 is a table showing temperature dependence of a thermal conductivity in a gas.

FIGS. 6 and 7 are graphs showing measurement results for describing the output characteristics of the gas detection device 10. In this detection, the thermal runaway phenomenon of the thermistor 2 is used.

FIG. 6 shows the sensor temperature in a carbon dioxide ($CO_2$) gas atmosphere having different concentrations, that is, the temperature of the thermistor 2, and FIG. 7 shows the sensor voltage as well.

The temperature (° C.) of the sensor and the sensor voltage (V) were measured in an atmosphere of 100% nitrogen ($N_2$) (pure $N_2$), atmospheres based on nitrogen ($N_2$) containing 5%, 10%, or 20% of carbon dioxide ($CO_2$), and an atmosphere of 100% carbon dioxide ($CO_2$).

In FIG. 6, a horizontal axis indicates time (seconds), a vertical axis indicates sensor temperature (° C.), and a process from a start to an end of the thermal runaway is shown. As shown in the drawing, in the thermal runaway process, the temperature increases sharply from a measurement start temperature of 25° C. to 120° C. or higher. It can be seen that the sensor temperature increases as the concentration of carbon dioxide ($CO_2$) increases with 100% nitrogen ($N_2$) as a reference. This is due to the fact that the thermal conductivity of carbon dioxide ($CO_2$) is smaller than the thermal conductivity of nitrogen ($N_2$). That is, this is because, when the concentration of carbon dioxide ($CO_2$) becomes high, the thermal conductivity of the atmosphere becomes small, the heat dissipation of the thermistor 2 becomes small, and temperature drop becomes small.

FIG. 7 shows the sensor voltage corresponding to the sensor temperature of FIG. 6. A horizontal axis shows time (seconds), and a vertical axis shows sensor voltage (V). It can be seen that the sensor voltage decreases as the concentration of carbon dioxide ($CO_2$) increases with 100% nitrogen ($N_2$) as a reference. It has an inverse relationship with the change in the sensor temperature. The resistance of the sensor (the thermistor) changes due to the change in the sensor temperature, and the change in the resistance is detected as the sensor voltage.

As shown with reference to FIGS. 3 and 4, in the detection of the concentration of the detection target gas, the gas detection device 10 is driven, and an overvoltage of a constant voltage is applied to the thermistor 2 of the thermal-conductivity-type gas sensor 1 in the atmosphere by the power supply circuit Ep. As a result, the thermistor 2 is in the thermal runaway state, the sensor temperature increases sharply (refer to FIG. 6), and the sensor voltage drops sharply (refer to FIG. 7). Therefore, the sensor voltage $V_{out}$ corresponding to the concentration of carbon dioxide ($CO_2$) can be obtained. Further, since the change in the sensor voltage $V_{out}$ is steep, it can be obtained as a large voltage value, and the sensitivity can be increased.

The sensor voltage $V_{out}$ is input to the microcomputer 12, the sensor output is calculated based on this input, and the concentration of carbon dioxide ($CO_2$) is calculated from the sensor output and is output to the detection output part O/P as a detection output. The sensor output (the voltage) is a voltage difference compared with the sensor voltage when nitrogen ($N_2$) is 100% as a reference (a zero level). Therefore, in order to detect carbon dioxide ($CO_2$) as the detection target gas, an output of a reference gas (100% nitrogen) is measured in advance.

The storage means of the microcomputer 12 stores in advance a pattern of changes in the sensor output according to the concentration of carbon dioxide ($CO_2$), and the microcomputer 12 performs an operation of comparing and calculating an obtained sensor output pattern and the concentration pattern stored in advance and calculates and outputs the concentration of carbon dioxide ($CO_2$) as the detection output. It is possible to take a large change in the sensor output using the thermal runaway phenomenon of the thermistor 2 in this way and thus to detect the concentration of carbon dioxide ($CO_2$) with high sensitivity.

Therefore, the gas detection method as described above includes a step of supplying an excess power to the thermistor 2 and putting the thermistor 2 in the thermal runaway state, and a step of detecting the detection target gas in the thermal runaway state. Further, after the step of putting the thermistor 2 in the thermal runaway state, there is a step of cooling the thermistor 2, and an intermittent operation is possible with the thermal runaway process and the cooling process as one cycle.

With reference to FIGS. 6 and 7 again, setting of optimum conditions according to a concentration of the detection target gas will be described. Highly sensitive detection can be performed according to a concentration range of the detection target gas by setting a temperature of the thermistor 2 (a measurement start temperature: 25° C. in this example) at the start of measurement (detection) and an elapsed time (a detection time) from the start of measurement.

As shown in FIG. 7, it can be said that, with reference to a curve showing the change in the sensor voltage of 100% nitrogen ($N_2$) (pure $N_2$), a time when the voltage difference from this curve is large is a detection time with good sensitivity. Therefore, for example, when the detection time is set to 10 seconds, a range of carbon dioxide ($CO_2$) concentration of 20% to 100% can be detected accurately. Further, when the detection time is set to 30 seconds, a range of carbon dioxide ($CO_2$) concentration of 0% to 5% can be detected accurately.

In either case, it is the detection time in which the temperature difference and the voltage difference in the thermal runaway process are the largest, and it can be seen that the optimum conditions for high sensitivity are obtained. The optimum conditions for the detection time can be set from the input part I/P connected to the microcomputer 12, and the detection output is output from the detection output part O/P based on these settings. Further, the measurement start temperature can be set by a temperature control unit or the like which will be described later.

As described above, in the thermal runaway state, the temperature difference and the voltage difference become larger than in a steady state after 45 seconds from the start of measurement, and the sensitivity becomes high. Therefore, the detection target gas can be detected with high sensitivity by setting the detection time as the elapsed time from the start of the detection. It is possible to achieve both high sensitivity and wide range detection with a wide range of concentration detection using the characteristics peculiar to such a thermal runaway state. In addition, detection due to the intermittent operation with the thermal runaway process and the cooling process as one cycle is possible, and it is possible to suppress power consumption.

(Detection of Detection Target Gas in Mixed Gas)

The gas detection device 10 having the thermal-conductivity-type gas sensor 1 in which the thermal runaway phenomenon of the thermistor 2 is utilized can accurately detect a concentration of a detection target gas by setting an operating temperature at which the thermal runaway state occurs even when a gas having a large heat conduction and a gas having a low heat conduction are mixed.

Figure 9:
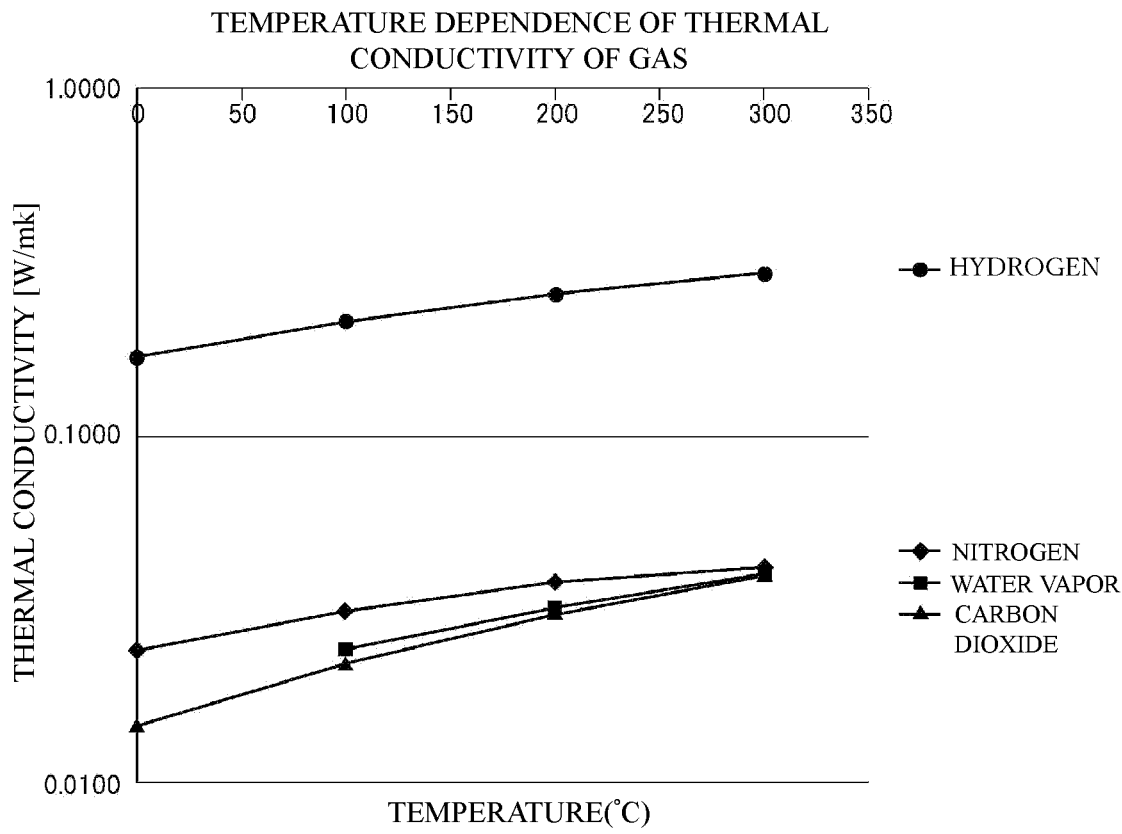
FIG. 9 is a graph showing the temperature dependence of the thermal conductivity of a gas.

A case in which a concentration is detected using hydrogen ($H_2$) gas in the atmosphere as a detection target gas will be described with reference to FIGS. 8 and 9. FIG. 8 is a table showing temperature dependence of a thermal conductivity of a gas, and FIG. 9 is a graph thereof. They show the change in the thermal conductivity from 0° C. to 300° C. for nitrogen ($N_2$), carbon dioxide ($CO_2$), hydrogen ($H_2$) and water vapor ($H_2O$). Hydrogen ($H_2$) corresponds to a gas having large heat conduction, and nitrogen ($N_2$), carbon dioxide ($CO_2$) and water vapor ($H_2O$) correspond to gases having small heat conduction.

In FIG. 9, a horizontal axis indicates temperature (° C.) and a vertical axis indicates thermal conductivity (W/m·K). As shown in FIG. 9, it can be seen that the thermal conductivity of each gas tends to increase as the temperature thereof increases.

Here, a ratio of the thermal conductivity with respect to each gas will be examined with reference to nitrogen ($N_2$), which is a main component of the atmosphere, in the temperature range of 0° C. to 300° C. In the case of hydrogen ($H_2$), a ratio with respect to nitrogen ($N_2$) is slightly larger, but there is no significant change. On the other hand, the ratio of each of carbon dioxide ($CO_2$) and water vapor ($H_2O$) with respect to nitrogen ($N_2$) becomes smaller as the temperature increases, and the difference in thermal conductivity tends to become smaller. At a temperature near 300° C., the thermal conductivity of each of carbon dioxide ($CO_2$) and water vapor ($H_2O$) is close to the thermal conductivity of nitrogen ($N_2$).

Therefore, when the concentration of hydrogen ($H_2$) gas is detected, an overvoltage is applied to set the operating temperature of the thermistor 2 so that the thermistor 2 is in the thermal runaway state near the ambient temperature of about 300° C. As a result, the influence of carbon dioxide ($CO_2$) and water vapor ($H_2O$) can be made extremely small, and the concentration of hydrogen ($H_2$) can be detected accurately.

In a specific detection method, as described above, based on nitrogen ($N_2$), the concentration of hydrogen ($H_2$) is calculated and output by the sensor output that is the voltage difference between the sensor voltage of nitrogen ($N_2$) at a temperature near 300° C. and the sensor voltage of hydrogen ($H_2$) with the voltage difference between the sensor voltage of nitrogen ($N_2$) at the temperature near 300° C. as a reference. Therefore, in this gas detection method, in a temperature of an atmosphere in which a detection target gas and a plurality of gases other than the detection target are mixed and the thermal conductivities of the plurality of gases other than the detection target are close to each other, the concentration of the detection target gas is detected by applying an overvoltage and setting the operating temperature of the thermistor 2 so that the thermistor 2 is in the thermal runaway state.

In addition, since the thermal conductivities of carbon dioxide ($CO_2$) and water vapor ($H_2O$) have a small difference in the range of 100° C. to 300° C. and tends to be almost the same, it is difficult to distinguish these two gases and to detect the concentrations thereof. However, for example, since the influence of water vapor ($H_2O$) can be reduced by setting the atmospheric temperature to 0° C. and setting the applied voltage so that the thermistor 2 is in the thermal runaway state in this case, carbon dioxide ($CO_2$) can be easily detected. This is because, in a state in which the atmospheric temperature is 0° C., the concentration of saturated water vapor ($H_2O$) is 6,025 ppm which is an extremely small amount.

It is possible to take a large change in the sensor output using the thermal runaway phenomenon of the thermistor 2 as described above, and thus even when gases other than the detection target gas are mixed, the influence of the disturbance gases can be reduced, and the concentration of the detection target gas can be detected with high sensitivity.

(Hydrogen Gas Detection)

A case in which the concentration of hydrogen ($H_2$) gas is detected will be described with reference to FIGS. 10 to 12.

Figure 10:
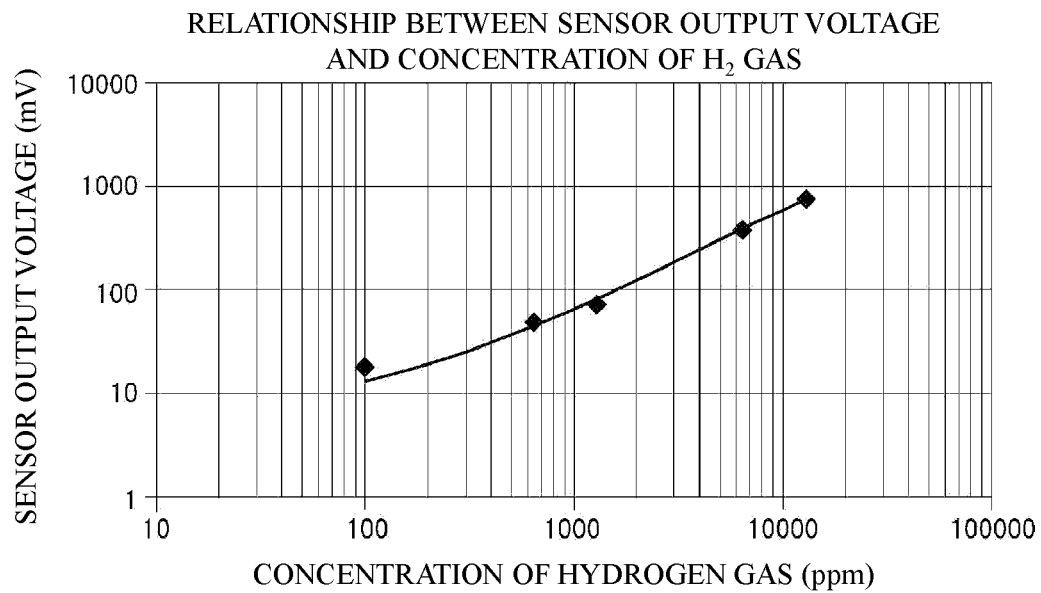
FIG. 10 is a measurement result for describing the output characteristics of the gas detection device, and is a graph showing a relationship between a sensor output voltage and a concentration of hydrogen gas.
Figure 11:
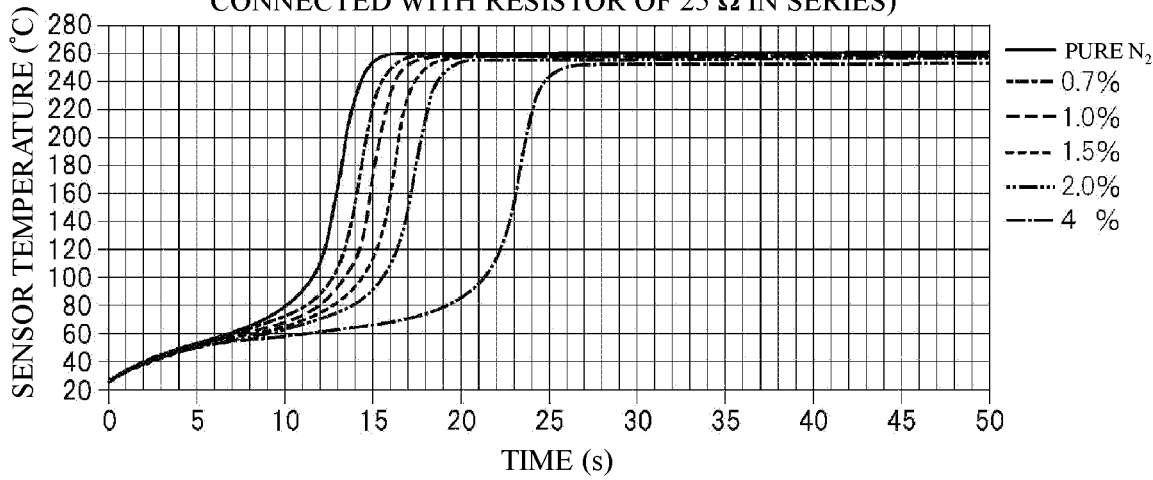
FIG. 11 is a graph showing sensor temperatures in hydrogen gas atmospheres having different concentrations.
Figure 12:
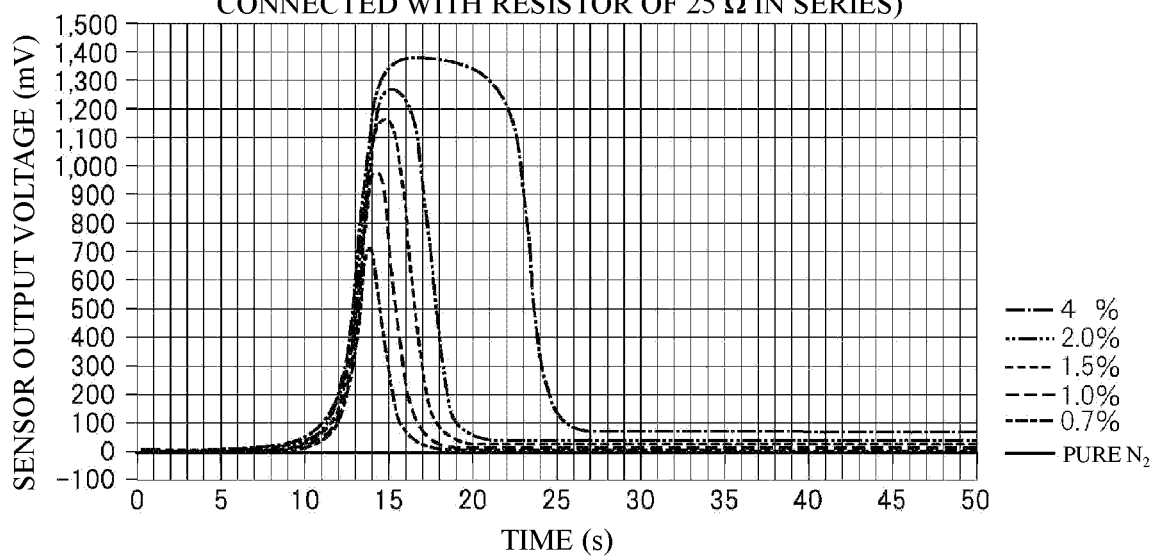
FIG. 12 is a graph showing the sensor output voltage in hydrogen gas atmospheres having different concentrations.

FIGS. 10 to 12 are graphs showing measurement results for describing the output characteristics of the gas detection device 10, FIG. 10 shows a relationship between the sensor output voltage of hydrogen ($H_2$) gas and the concentration, FIG. 11 shows the sensor temperature in a hydrogen ($H_2$) gas atmosphere having different concentrations, and FIG. 12 shows the sensor output voltage in the hydrogen ($H_2$) gas atmosphere having different concentrations. The detection of the gas concentration utilizes the thermal runaway phenomenon of the thermistor 2.

In FIG. 10, a horizontal axis indicates the hydrogen ($H_2$) gas concentration (ppm), and a vertical axis indicates the sensor output voltage (mV). The sensor output voltage increases as the hydrogen ($H_2$) gas concentration increases. In this case, since the thermal runaway phenomenon is used, it is possible to take a large change in the sensor output, and it is possible to detect the concentration of hydrogen ($H_2$) gas as the detection target gas with high sensitivity. In addition, a range of hydrogen ($H_2$) gas concentration detection is wide, and wide range detection of 100 ppm to 13,000 ppm is possible.

As shown in FIGS. 11 and 12, the sensor temperature (° C.) and the sensor output voltage (V) in an atmosphere containing 100% nitrogen ($N_2$) (pure $N_2$) and an atmosphere containing 0.7% to 4% hydrogen ($H_2$) based on nitrogen ($N_2$) were measured.

In FIG. 11, a horizontal axis indicates time (seconds) and a vertical axis indicates sensor temperature (° C.). As shown in the drawing, the temperature increases sharply in the thermal runaway state. It can be seen that the sensor temperature decreases as the concentration of hydrogen ($H_2$) increases with reference to 100% nitrogen ($N_2$). This is caused by the fact that the thermal conductivity of hydrogen ($H_2$) is higher than the thermal conductivity of nitrogen ($N_2$). That is, this is because, as the concentration of hydrogen ($H_2$) increases, the thermal conductivity of the atmosphere increases, the heat dissipation of the thermistor 2 increases, and the degree of temperature drop increases.

FIG. 12 shows the sensor output voltage corresponding to the sensor temperature of FIG. 11. A horizontal axis indicates time (seconds), and a vertical axis indicates sensor output voltage (V). It can be seen that the sensor output voltage increases as the concentration of hydrogen ($H_2$) increases with 100% nitrogen ($N_2$) as a reference (zero level). It has an inverse relationship with the change in sensor temperature. The resistance of the sensor (the thermistor) changes due to the change in the sensor temperature, this change in the resistance is detected as the sensor voltage, and also, the voltage difference of the sensor voltage with 100% nitrogen ($N_2$) as a reference (zero level) is detected as the sensor output voltage.

It is possible to take a large change in the sensor output using the thermal runaway phenomenon of the thermistor 2 in this way and thus to detect the concentration of hydrogen ($H_2$) with high sensitivity.

In the drawing of the following embodiment, the same or corresponding parts as those of the present embodiment are designated by the same reference numerals, and duplicate description will be omitted.

Second Embodiment

A second embodiment will be described with reference to FIGS. 13 and 14. The present embodiment is a gas detection method in which a temperature of a thermal-conductivity-type gas sensor 1 is controlled to a constant temperature and is then held, and a constant voltage is applied to the thermistor 2 to put it in the thermal runaway state. Therefore, a step of bringing the thermal-conductivity-type gas sensor 1 to a constant temperature is included before the step of putting the thermistor 2 in the thermal runaway state.

The influence of the atmospheric temperature can be suppressed by keeping the temperature of the thermal-conductivity-type gas sensor 1 constant. Therefore, the thermal runaway state can be easily controlled, stable detection can be performed, and both high sensitivity and wide range detection can be achieved. Preferably, the constant temperature of the thermal-conductivity-type gas sensor 1 is controlled to ±0.1° C. or less.

Figure 13:
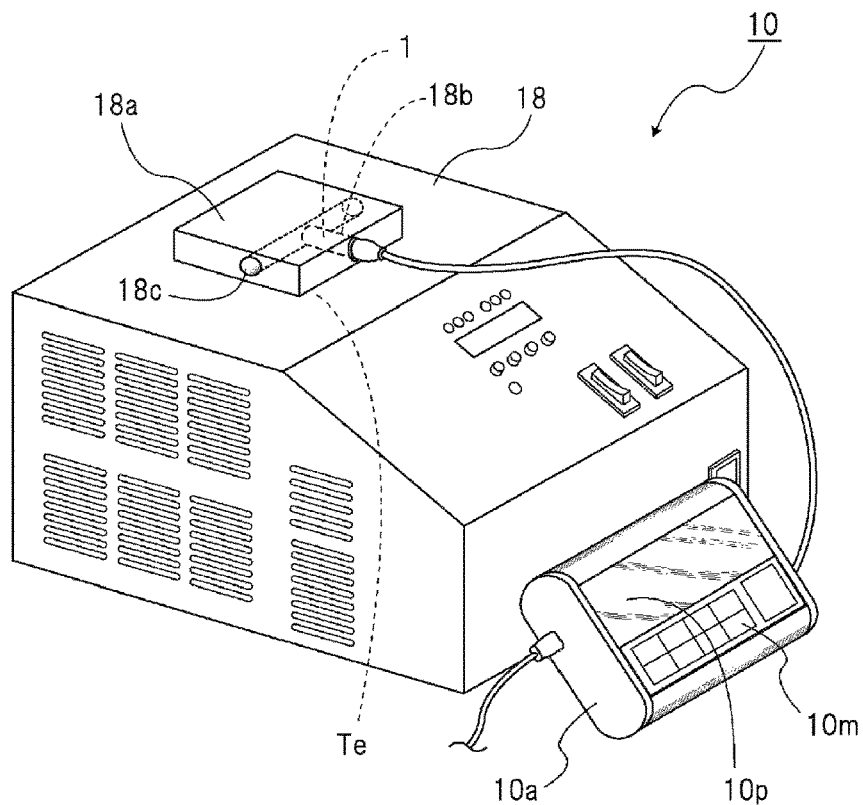
FIG. 13 is a perspective view showing a configuration example of a gas detection device according to a second embodiment of the present invention.
Figure 14:
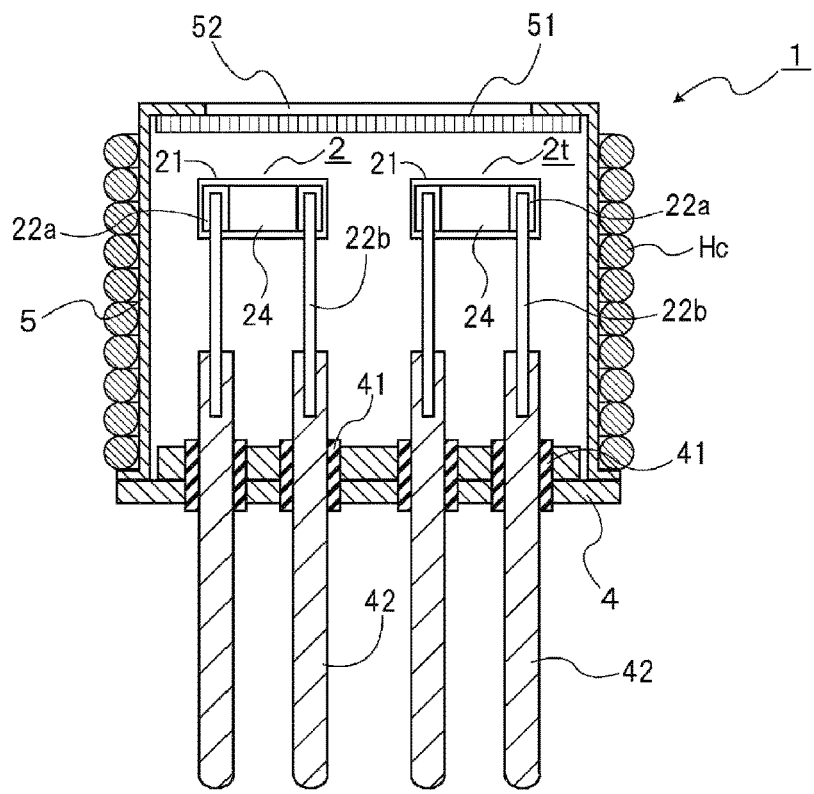
FIG. 14 is a cross-sectional view showing a thermal-conductivity-type gas sensor in the configuration example of the gas detection device.

As shown in FIGS. 13 and 14, a temperature control element is used as the method for controlling the temperature of the thermal-conductivity-type gas sensor 1 to a constant temperature. Examples of the temperature control element include a Peltier element as a thermoelectric element and a heater as a heating element.

(Thermoelectric Element)

FIG. 13 shows a configuration example of the gas detection device 10 equipped with a thermoelectric element Te as a temperature control element for holding the thermal-conductivity-type gas sensor 1 at a constant temperature. In this configuration example, a temperature control unit 18 with the built-in thermoelectric element Te is shown as a heating and/or cooling device that holds the gas sensor 1 at a constant temperature. Specifically, the gas detection device 10 includes a detection circuit part 10a in which the microcomputer 12 and the power supply circuit 17 shown in FIG. 4 are accommodated, and the temperature control unit 18.

Circuit parts are accommodated in a housing of the detection circuit part 10a, a display panel 10p and an operation button 10m are provided on the front side of the detection circuit part 10a, and the thermal-conductivity-type gas sensor 1 is connected to the detection circuit part 10a by an electric wire.

The temperature control unit 18 is a temperature controller capable of cooling and heating control, has a built-in Peltier element as the thermoelectric element Te and can set a temperature in a range of −20° C. to +80° C. The Peltier element functions as a heating and/or cooling element.

Further, an installation member 18a made of a material having good heat conduction such as copper is disposed on a plate (not shown) on an upper surface of the temperature control unit 18. An insertion hole 18b for the thermal-conductivity-type gas sensor 1 and a flow hole 18e through which an atmospheric gas can flow are formed in the installation member 18a.

The thermal-conductivity-type gas sensor 1 is inserted into the insertion hole 18b, and in the inserted state, a gas flows in and out from the ventilation part 51 of the thermal-conductivity-type gas sensor 1 through the flow hole 18e, and the gas can be detected.

According to the above configuration, the temperature control unit 18 can be driven, and the temperature of the thermal-conductivity-type gas sensor 1 can be controlled to a constant temperature by the thermoelectric element Te.

(Heating Element)

FIG. 14 shows a configuration example in which a heater coil which is a heating element is provided as the temperature control element for holding the thermal-conductivity-type gas sensor 1 at a constant temperature. FIG. 14 is a cross-sectional view showing the thermal-conductivity-type gas sensor.

As shown in FIG. 11, a heater coil Hc is wound around the exterior case 5 as the heating element. Further, a temperature detecting thermosensitive resistance element 2t is mounted in the thermal-conductivity-type gas sensor 1, and the above-described thermistor 2 and the temperature detecting thermosensitive resistance element 2t are disposed in the exterior case 5. The temperature detecting thermosensitive resistance element 2t controls a heating temperature of the heater coil Hc. Further, the temperature detecting thermosensitive resistance element 2t is a thin-film thermistor like the thermistor 2.

With such a configuration, the temperature of the thermistor 2 of the thermal-conductivity-type gas sensor 1 is controlled to a constant temperature by the heater coil He of which a heating temperature is controlled by the temperature detecting thermosensitive resistance element 2t.

Third Embodiment

Figure 15:
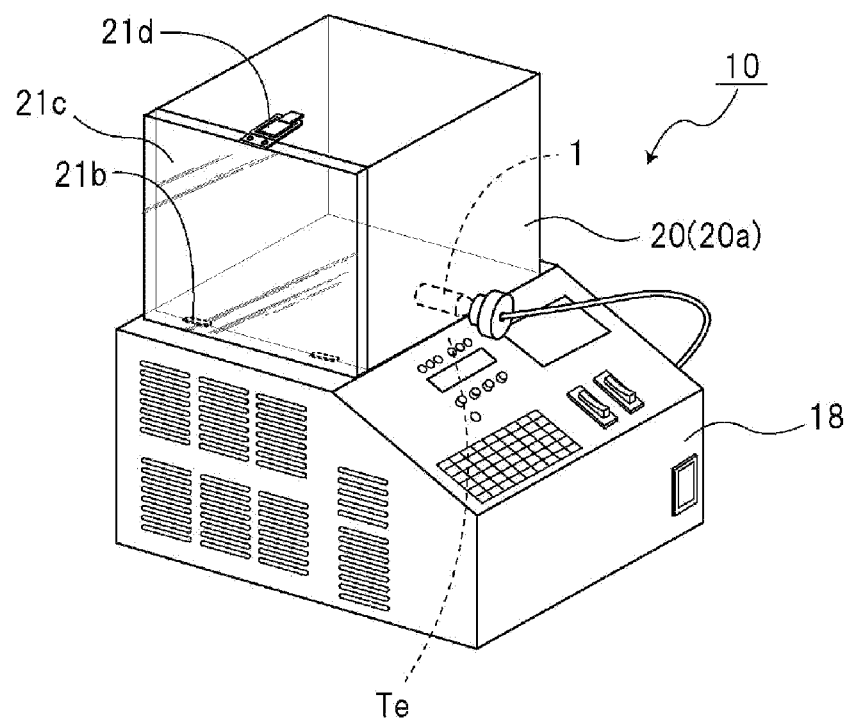
FIG. 15 is a perspective view showing a configuration example of a gas detection device according to a third embodiment of the present invention.
Figure 16:
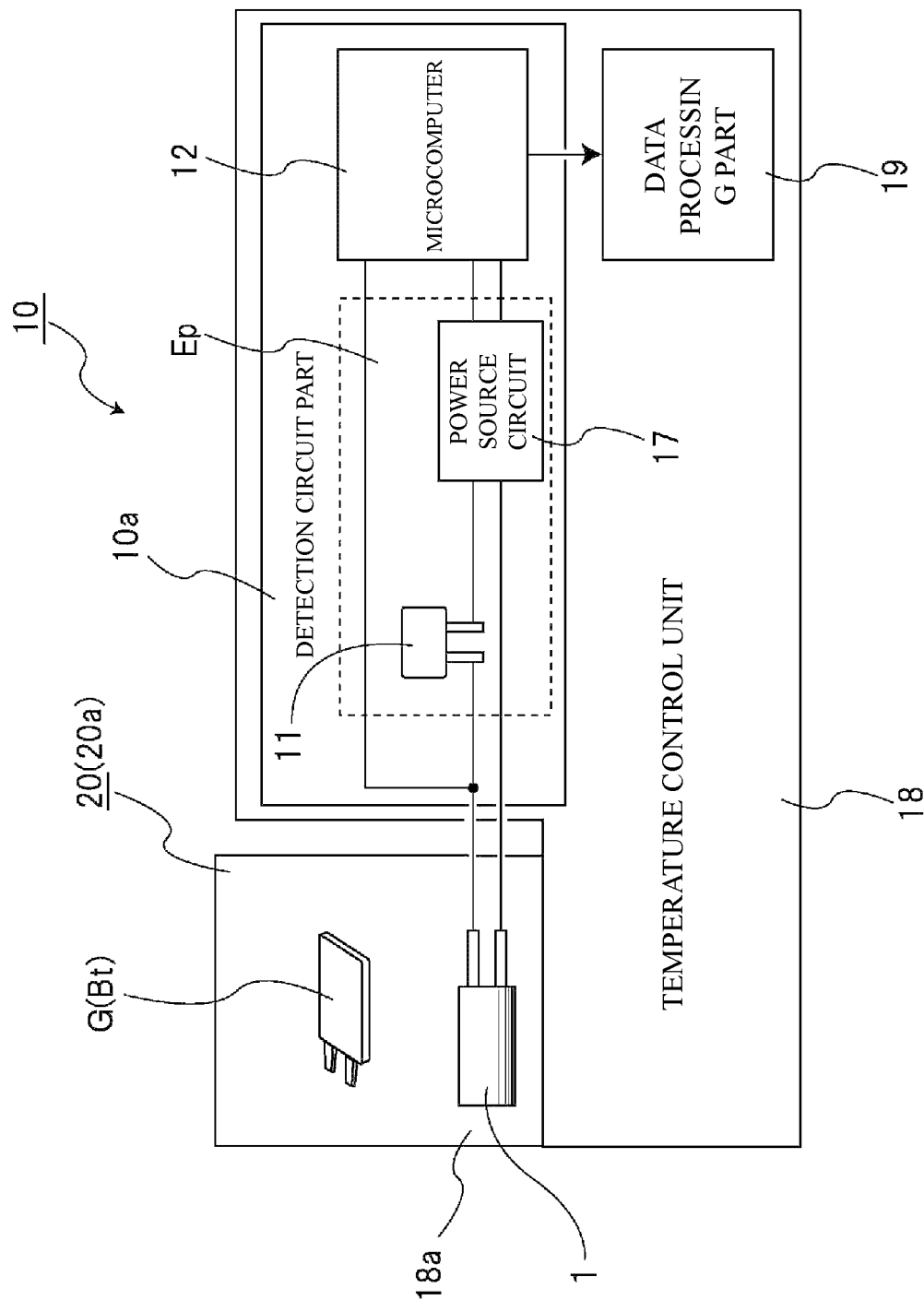
FIG. 16 is a block system diagram showing the gas detection device.

A gas detection device of a third embodiment will be described with reference to FIGS. 15 and 16. FIG. 15 is a configuration example showing the gas detection device, and FIG. 16 is a block system diagram showing the gas detection device.

The present embodiment includes a sealed space forming part for accommodating the thermal-conductivity-type gas sensor and the detection target gas in the same space, detects a change in resistance of the thermistor according to the thermal conductivity of the detection target gas in the sealed space forming part, and detects the concentration of the detection target gas.

As shown in the drawing, a gas detection device 10 includes a thermal-conductivity-type gas sensor 1, a temperature control unit 18, a detection circuit part 10a, a data processing part 19, and a sealed space forming part 20. The detection circuit part 10a and the data processing part 19 are provided in the temperature control unit 18.

The temperature control unit 18 serves to hold the thermal-conductivity-type gas sensor 1 at a constant temperature, and has a built-in thermoelectric element Te which is a temperature control element as a heating and/or cooling device. The temperature control unit 18 is a temperature controller capable of cooling and heating control, has a built-in Peltier element as the thermoelectric element Te and can set a temperature in a range of −20° C. to +80° C. A heater or the like can be applied as the heating element. Further, preferably, the constant temperature has an accuracy of ±0.1° C. or less.

Further, an installation part of a thermal-conductivity-type gas sensor 1 made of a material having good heat conduction such as copper is provided on a plate (not shown) on an upper surface of the temperature control unit 18, and heat from this installation part is conducted to the thermal-conductivity-type gas sensor 1.

The detection circuit part 10a has circuit parts, and the thermal-conductivity-type gas sensor 1 is connected thereto by an electric wire. Further, a data processing part 19 is connected to the detection circuit part 10a in order to process detection output data from the detection circuit part 10a.

The sealed space forming part 20 is formed of a box-shaped container metal or resin sealed accommodation body 20a, and is provided on the upper surface of the temperature control unit 18 in the present embodiment. The sealed accommodation body 20a can ensure an internal space in a hermetically sealed manner, and the thermal-conductivity-type gas sensor 1 and a detection target object G are accommodated and disposed therein.

Further, one side surface side of the sealed accommodation body 20a is a lid part 21c which can be opened and closed by a hinge mechanism 21b and can be held in a closed state by a clamp mechanism 21d. That is, the sealed accommodation body 20a can be opened and closed by opening and closing the lid part 21c, and the detection target object G can be accommodated and taken out in a hermetically sealed. The lid parts 21c may be provided at a plurality of locations.

Further, the thermal-conductivity-type gas sensor 1 is mounted on the front surface side of the sealed accommodation body 20a to be disposed in the internal space of the sealed accommodation body 20a. Therefore, in a state in which the thermal-conductivity-type gas sensor 1 and the detection target object G are accommodated in the sealed accommodation body 20a which is the sealed space forming part 20, the thermal-conductivity-type gas sensor 1 and the detection target object G are disposed in the same sealed space, a small amount of gas (the detection target gas) leaking from the detection target object G diffuses into the inside partitioned by the sealed accommodation body 20a, and the concentration of the gas is detected by the thermal-conductivity-type gas sensor 1 according to the thermal conductivity of the gas. Preferably, a degree of vacuum when the sealed space forming part 20 is evacuated is 1000 Pa or less. In order to detect a gas, it is necessary to keep a degree of sealing at a certain level.

Next, an operation of the gas detection device 10 will be described. In the present embodiment, a case in which a concentration of a small amount of specific gas leaking from the detection target object G accommodated in the sealed space forming part 20 is detected will be described. Since the basic operation is the same as in the first embodiment, duplicate description may be omitted.

In the detection and measurement of a gas, the thermal-conductivity-type gas sensor 1 is held at a constant temperature by the temperature control unit 18. Then, when the detection target object G is accommodated and disposed in the sealed accommodation body 20a which is the sealed space forming part 20, a specific gas leaking from the detection target object G diffuses into the sealed accommodation body 20a.

An overvoltage is applied to the thermistor 2 by driving the gas detection device 10, the thermistor 2 is in the thermal runaway state, in this thermal runaway state, a change in the heat dissipation state of the thermistor 2 is detected as a temperature change according to an inherent thermal conductivity of the leaking detection target gas, this temperature change is detected as a change in resistance of the thermistor 2, and the concentration of the leaking detection target gas is detected. Even when the concentration of the detection target gas is extremely small, it is possible to take a large change in the sensor output by supplying an excess power to the thermistor 2 and putting the thermistor 2 in the thermal runaway state, and the improvement of the concentration detection of the detection target gas can be expected.

As the detection target object G, for example, a lithium ion polymer battery Bt can be applied, and a measurement related to an inspection of the lithium ion polymer battery Bt can be performed. Specifically, it is a measurement regarding a leakage of hydrogen ($H_2$) gas in the lithium ion polymer battery Bt. As shown in FIG. 16, the lithium ion polymer battery Bt is disposed in the sealed accommodation body 20a, and the leakage of the diffused hydrogen ($H_2$) gas is detected based on the inherent thermal conductivity.

As described above, according to the present embodiment, the thermal-conductivity-type gas sensor 1 and the detection target gas are accommodated in the same space of the sealed space forming part 20. Therefore, the detection target object G is accommodated in the sealed space forming part 20, and a specific gas leaking from the detection target object G is diffused into the sealed space forming part 20 to detect the specific gas. Therefore, it is possible to detect a concentration of a small amount of a specific gas with high sensitivity using the diffusion phenomenon of a specific gas, the thermal conductivity, and the thermal runaway phenomenon of the thermistor 2 without using a means for forcibly introducing a specific gas.

Fourth Embodiment

Figure 17:
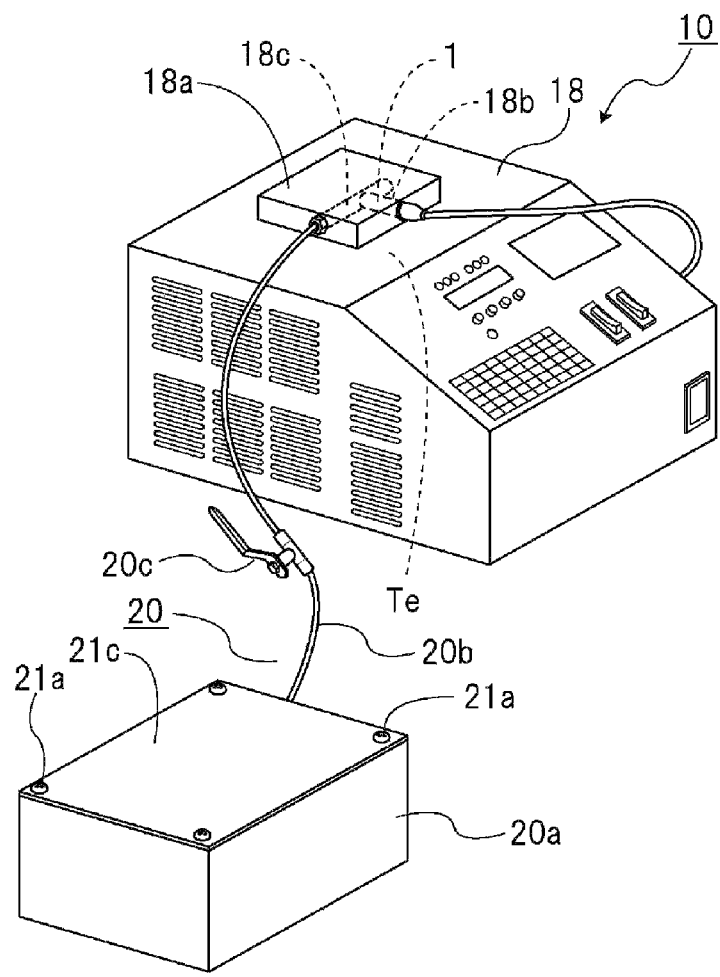
FIG. 17 is a perspective view showing a configuration example of a gas detection device according to a fourth embodiment of the present invention.
Figure 18:
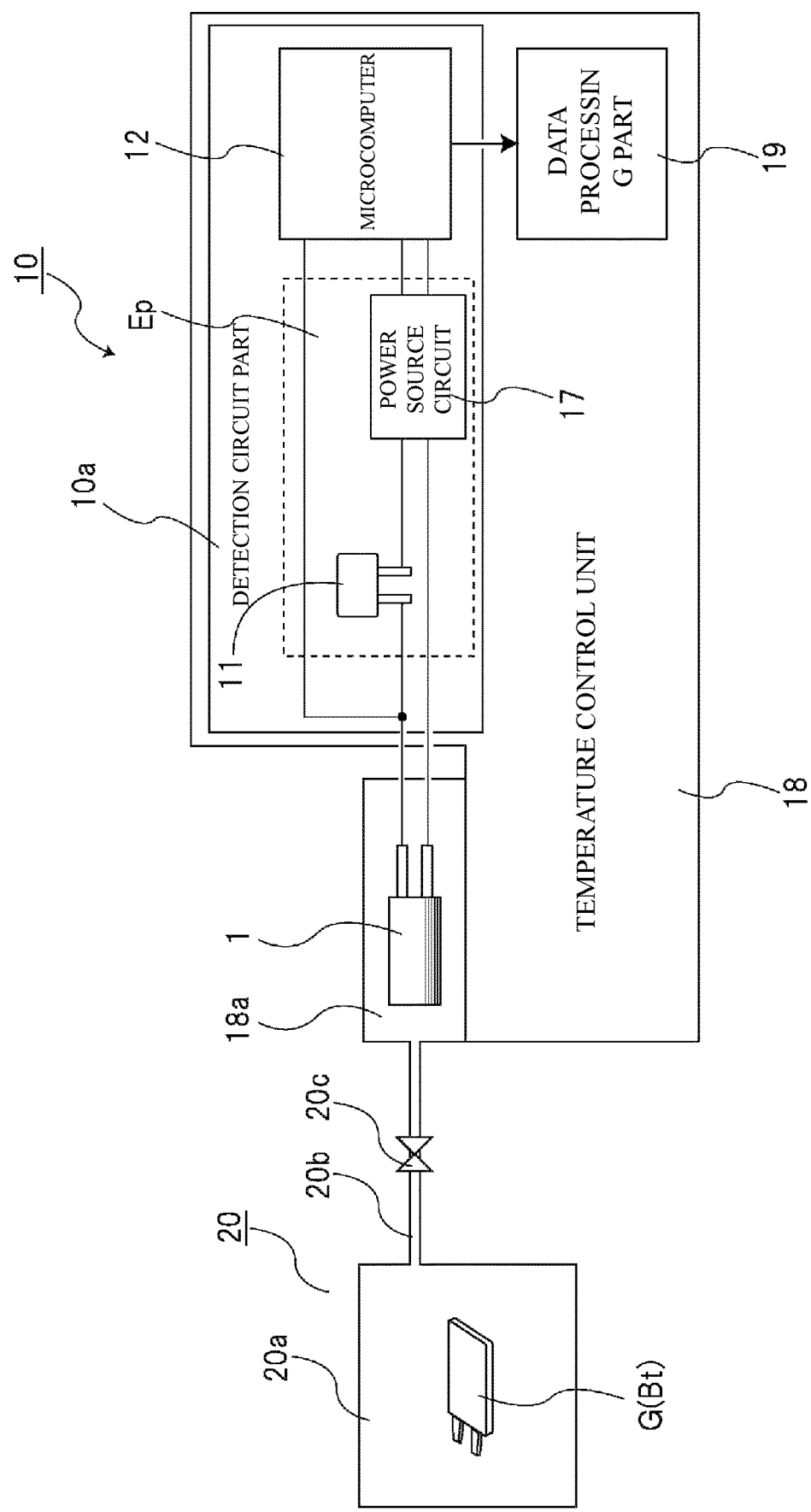
FIG. 18 is a block system diagram showing the gas detection device.

A gas detection device of a fourth embodiment will be described with reference to FIGS. 17 and 18. FIG. 17 is a configuration example showing a gas detection device, and FIG. 18 is a block system diagram showing the gas detection device. The same or corresponding parts as those in the third embodiment are designated by the same reference numerals, and duplicate description will be omitted.

The configuration of the sealed space forming part 20 is different between the gas detection device 10 of the present embodiment and the gas detection device 10 of the third embodiment. The sealed space forming part 20 of the present embodiment includes a sealed accommodation body 20a in which the detection target object G is disposed and a pipe part 20b that tightly connects the sealed accommodation body 20a to the thermal-conductivity-type gas sensor 1 side in a communicating state.

Further, an installation member 18a is disposed as an installation part of the thermal-conductivity-type gas sensor 1 made of a material having good heat conduction such as copper on a plate (not shown) on an upper surface of the temperature control unit 18. An insertion hole 18b for the thermal-conductivity-type gas sensor 1 and a flow hole 18c through which an atmospheric gas can flow are formed in the installation member 18a.

The thermal-conductivity-type gas sensor 1 is inserted into the insertion hole 18b, and in the inserted state, a gas flows in and out from the ventilation part 51 of the thermal-conductivity-type gas sensor 1 through the flow hole 18c, and the gas can be detected.

Specifically, the sealed space forming part 20 is configured of the installation member 18a as the installation part in which the thermal-conductivity-type gas sensor 1 is mounted, the sealed accommodation body 20a in which the detection target object G is accommodated and disposed, and the pipe part 20b that tightly communicates the installation member 18a on the thermal-conductivity-type gas sensor 1 side with the sealed accommodation body 20a.

Specifically, the flow hole 18c of the installation member 18a, the internal space of the sealed accommodation body 20a, and an inner communication passage of the pipe part 20b are communicated with each other to form a sealed space. The sealed accommodation body 20a is a box-shaped container made of a metal or resin material and can ensure an internal space in a hermetically sealed manner. A detection target object G, for example, a lithium ion polymer battery Bt or the like, is accommodated and disposed therein. Further, an upper surface of the sealed accommodation body 20a is a lid part 21c, and the lid part 21c can be attached and detached by a removable fixing means 21a such as a screw. That is, the sealed accommodation body 20a can be opened and closed by attaching and detaching the lid part 21c, and the detection target object G can be accommodated and taken out in a hermetically sealed state.

The pipe part 20b is an elongated pipe made of a metal or resin material, and one end side thereof is connected to the flow hole 18c of the installation member 18a, and the other end side is connected to the sealed accommodation body 20a. Therefore, internal spaces of the flow hole 18c and the sealed accommodation body 20a communicate with each other by the pipe part 20b, and in a state in which the detection target object G is accommodated in the sealed accommodation body 20a, the gas sensor 1 and the detection target object G accommodated in the internal space of the sealed accommodation body 20a are accommodated and disposed in the sealed space forming part 20 of the same communicating space. Further, the opening and closing part 20c capable of opening and closing a connecting passage is provided in the middle of the connecting passage of the pipe part 20b. An opening and closing cock or the like can be applied to the opening and closing part 20c. The opening and closing part 20c may be provided at a plurality of locations in the middle of the connecting passage of the pipe part 20b.

The detection and measurement of gas is the same as that in the third embodiment. The detection target object G is disposed in the sealed accommodation body 20a. The pipe part 20b is in a communicating state, and the thermal-conductivity-type gas sensor 1 and the detection target object G are disposed in the same communicating space.

The detection target gas leaking from the detection target object G diffuses, passes through the communication passage of the pipe part 20b, passes through the flow hole 18c of the installation member 18a and comes into contact with the thermal-conductivity-type gas sensor 1. The thermistor 2 is put into the thermal runaway state by driving the gas detection device 10, and in this thermal runaway state, the change in the heat dissipation state of the thermistor 2 is detected as a temperature change according to the inherent thermal conductivity of the leaking detection target gas, and the concentration of the leaking detection target gas is detected.

As described above, according to the present embodiment, the same effects as those of the third embodiment can be obtained. In addition, since a diffusion rate of a gas differs according to the type of detection target gas, it is possible to control an opening and closing timing of the opening and closing part 20c in the pipe part 20b using the fact that diffusion speeds are different and thus to detect a concentration of a specific gas.

Fifth Embodiment

A gas detection device of a fifth embodiment will be described with reference to FIGS. 19 to 22. The present embodiment relates to a composite gas sensor having both functions of a thermal-conductivity-type gas sensor and a gas sensor (hereinafter referred to as a "porous adsorption type gas sensor") using a porous gas molecule adsorption material on which specific gas molecules are adsorbed and desorbed. Further, it is possible to detect a concentration of a detection target gas with high sensitivity by supplying an excess power to the thermistor and using the thermal runaway phenomenon of the thermistor.

Therefore, it is possible to realize a highly sensitive gas detection device that uses features of both the thermal-conductivity-type gas sensor and the porous adsorption type gas sensor.

Further, it is possible to detect more types of gases using two gas sensors of the thermal-conductivity-type gas sensor and the porous adsorption type gas sensor.

Example 1

Figure 19:
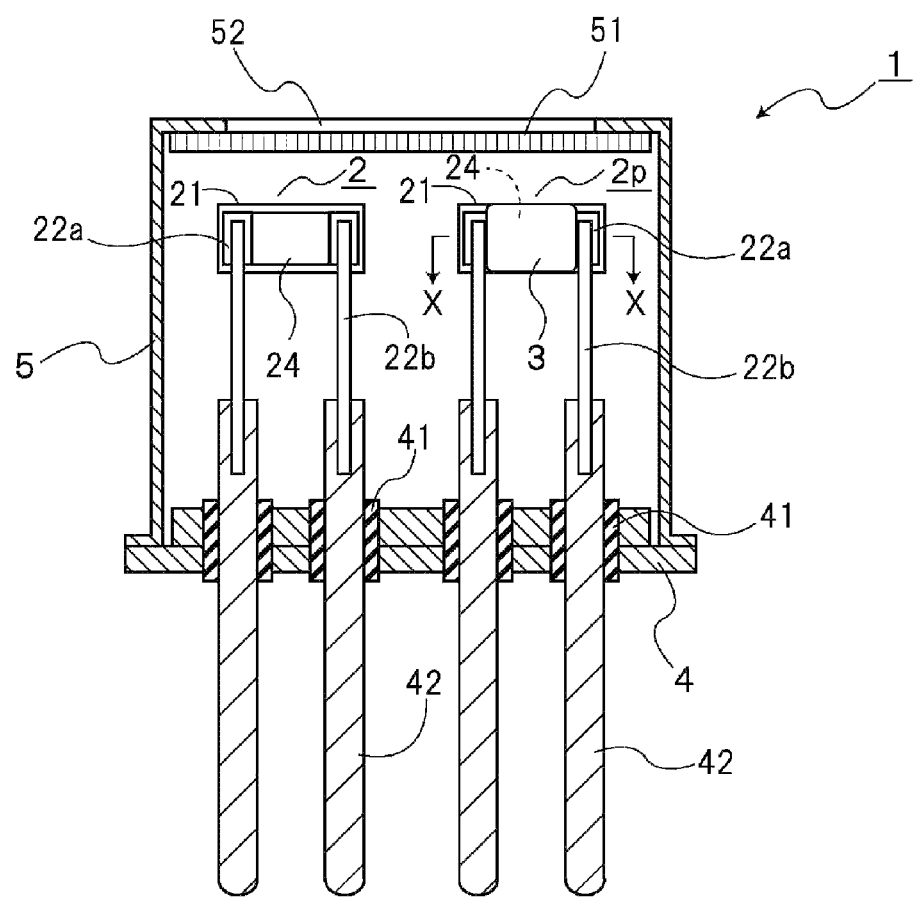
FIG. 19 is a cross-sectional view showing a thermal-conductivity-type gas sensor in a gas detection device according to a fifth embodiment (Example 1) of the present invention.
Figure 20:
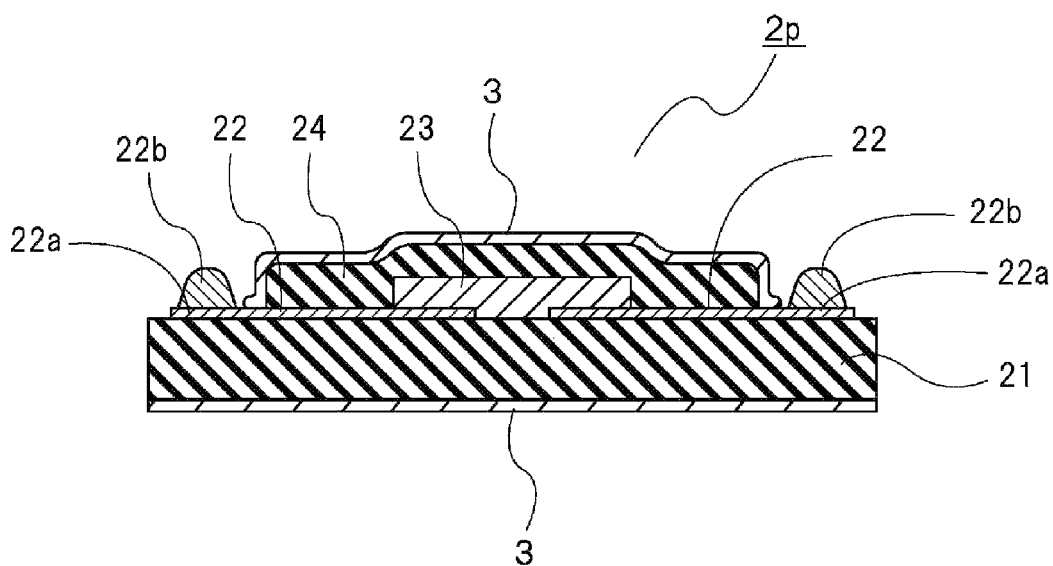
FIG. 20 is a cross-sectional view taken along line X-X in FIG. 19.

Example 1 will be described with reference to FIGS. 19 and 20. FIGS. 19 and 20 are cross-sectional views showing a gas sensor.

As shown in FIG. 19, a thermistor 2 functioning as the thermal-conductivity-type gas sensor and a thermistor 2p functioning as the porous adsorption type gas sensor are disposed and mounted in the exterior case 5 of the gas sensor 1. Since the thermistor 2 on the thermal-conductivity-type gas sensor side has the same configuration as that of the first embodiment (refer to FIGS. 1 and 2), description thereof will be omitted.

Meanwhile, as shown in FIG. 20, the thermistor 2p on the porous adsorption type gas sensor side is different from the thermistor 2 on the thermal-conductivity-type gas sensor side in that a gas molecule adsorption material 3 is thermally coupled to the thermistor 2p.

The gas molecule adsorption material 3 is formed in a film shape on a surface of the thermistor 2p. Specifically, the gas molecule adsorption material 3 is held in a state in which the material is formed on the front surface of the protective insulating layer 24 and a surface of the substrate 21 on the other surface side (the back surface side). Therefore, the thermistor 2p and the gas molecule adsorption material 3 are thermally coupled to the thin film element layer 23 via the protective insulating layer 24 and the substrate 21. That is, heat is conducted to each other between the thermistor 2p and the gas molecule adsorption material 3.

The gas molecule adsorption material 3 is a porous adsorption material. For example, a molecular sieve 3A (having a pore diameter of 0.3 nm) of A-type zeolite is formed in a film shape on the surface of the thermistor 2. A thickness dimension of the gas molecule adsorption material 3 is 1 μm to 5 μm. Since an extremely thin functional film can be formed on the thermistor 2p in this way, the heat capacity becomes smaller, and thus a porous adsorption type gas sensor having high sensitivity and excellent thermal responsiveness can be realized.

Further, as the gas molecule adsorption material 3, molecular sieves 4A, 5A, and 13X, high silica type zeolite, silver zeolite substituted with metal ions, or a porous metal complex can be used according to the detection target gas.

As the gas molecule adsorption material 3, the molecular sieve 3A (having a pore diameter of 0.3 nm) of A-type zeolite is used. This gas molecule adsorption material 3 generates a molecular sieve effect and adsorbs only molecules of which a diameter is smaller than a diameter of pores. Therefore, the gas molecule adsorption material 3 adsorbs hydrogen ($H_2$), helium (He), water vapor (water molecule) ($H_2O$) and ammonia ($NH_3$) in the atmosphere, but does not adsorb nitrogen ($N_2$) and oxygen (02). Therefore, a gas can be selectively detected according to a size of molecules, and selectivity of the detection target gas can be improved.

Further, a temperature of the gas molecule adsorption material 3 changes with heat of reaction due to adsorption and desorption of the molecules. Therefore, when the gas molecule is hydrogen ($H_2$), a phenomenon in which the temperature increases and changes when the gas molecule adsorption material 3 is heated to desorb hydrogen ($H_2$) occurs.

When an overvoltage is applied to the thermistor 2p and electric power is supplied, the thermistor 2p is energized and electric power is supplied, the thermistor 2p is self-heated and put in the thermal runaway state, and the gas molecule adsorption material 3 thermally coupled to the thermistor 2p is in a heated state. The gas molecule adsorption material 3 is thermally coupled to the thermistor 2p, but is not electrically connected and is in a non-energized state.

When the gas molecule adsorption material 3 is heated, hydrogen ($H_2$) adsorbed on the gas molecule adsorption material 3 is desorbed, and the temperature of the gas molecule adsorption material 3 itself changes according to the concentration. Therefore, the temperature (the sensor temperature) of the thermistor 2p changes according to the concentration of hydrogen ($H_2$), and the sensor voltage changes according to the concentration of hydrogen ($H_2$). Since the sensor temperature, the sensor voltage, and the sensor output change according to the concentration of hydrogen ($H_2$) in this way, the concentration of hydrogen ($H_2$) can be detected.

In the gas detection device having the gas sensor 1 as described above, the thermistor 2 that functions as the thermal-conductivity-type gas sensor and the thermistor 2p that functions as the porous adsorption type gas sensor can be switched and driven on a circuit.

Therefore, it is possible to realize a highly sensitive gas detection device that uses the features of both the thermal-conductivity-type gas sensor and the porous adsorption type gas sensor, for example, when the detection target gas has a low concentration of 1 ppm to 100 ppm, it is detected by the porous adsorption type gas sensor, and when the detection target gas has a high concentration of 100 ppm to several percent, it is detected by the thermal-conductivity-type gas sensor. Therefore, a gas detection method suitable for the thermal-conductivity-type gas sensor or the porous adsorption type gas sensor can be adopted.

Example 2

Figure 21:
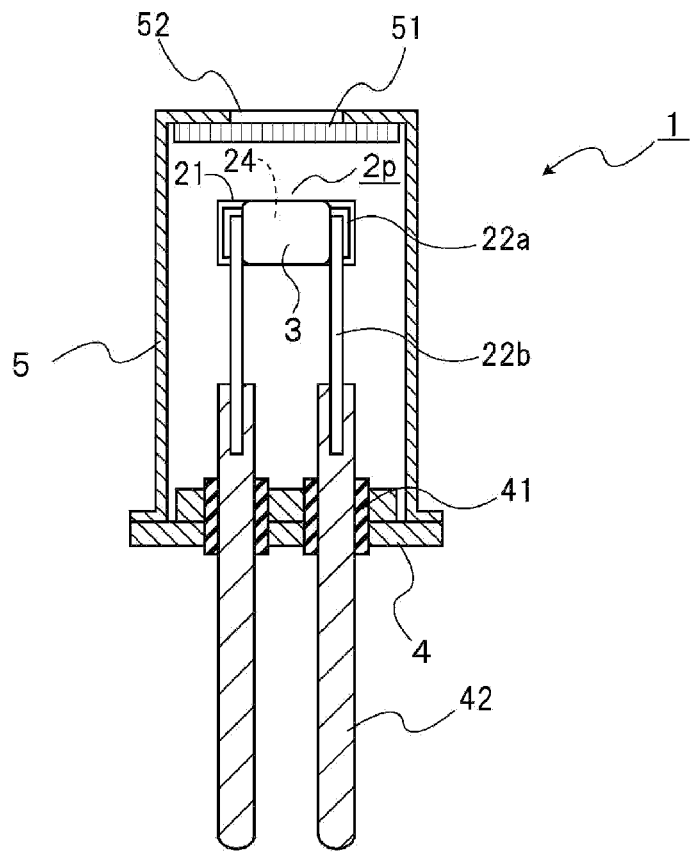
FIG. 21 is a cross-sectional view showing a gas sensor in the gas detection device according to Example 2.

Example 2 will be described with reference to FIGS. 21 and 22. FIG. 21 is a cross-sectional view showing a gas sensor, and FIG. 22 shows a relationship between an applied voltage and a sensor output voltage.

FIG. 21 shows a porous adsorption type gas sensor 1. The porous adsorption type gas sensor 1 includes a detection thermistor 2p that functions as the porous adsorption type gas sensor described in the above-described Example 1.

Figure 22:
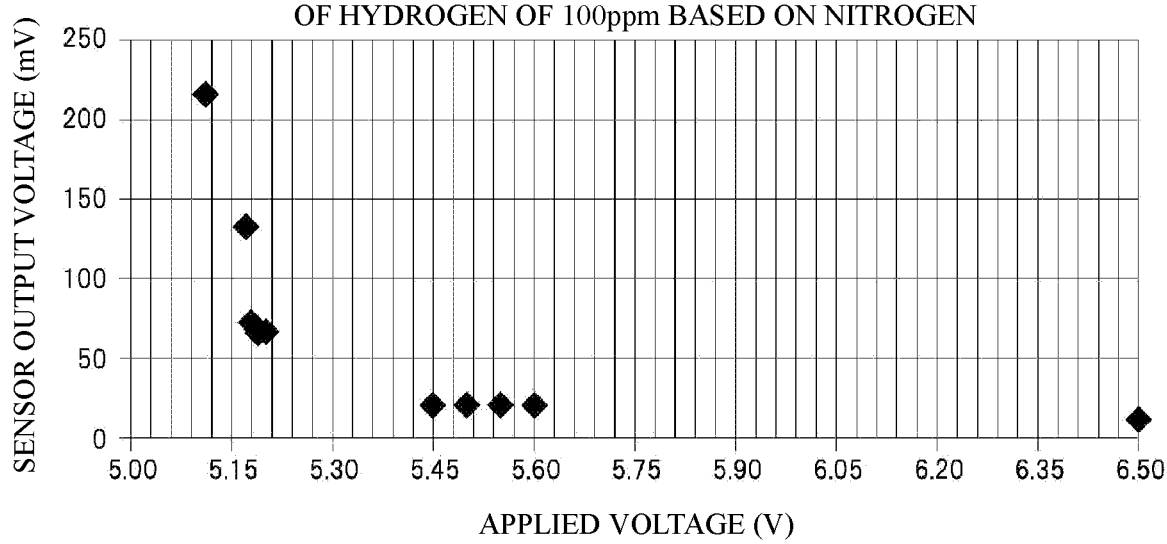
FIG. 22 is also a graph showing a relationship between the applied voltage and the sensor output voltage for describing Example 2.

FIG. 22 shows the relationship between an applied voltage of the thermistor 2p and a sensor output voltage when hydrogen ($H_2$) has a concentration of 100 ppm based on nitrogen ($N_2$), a horizontal axis shows the applied voltage (V), and a vertical axis shows the sensor output voltage (mV). The applied voltage is an overvoltage that causes the thermistor 2p to be in the thermal runaway state.

As shown in the drawing, a large sensor output voltage does not appear in a range in which the applied voltage is 5.3 V or more, whereas a large sensor output voltage appears in a range in which the applied voltage is less than 5.3 V. It is considered that this is because a function of detecting gas as the porous adsorption type gas sensor is dominant in the range in which the applied voltage is less than 5.3V, and a function of detecting gas as the thermal-conductivity-type gas sensor is dominant in the range in which the applied voltage is 5.3 V or more. That is, in the range in which the applied voltage is less than 5.3 V, a time of the thermal runaway state is long, and thus not only the gas on the surface of the gas molecule adsorption material 3 but also the gas deeply adsorbed in the gas molecule adsorption material 3 contribute to a reaction. Meanwhile, in the range in which the applied voltage is 5.3 V or more, it is considered that the time of the thermal runaway state is short, the reaction is limited to the surface of the gas molecule adsorption material 3, and the function as the thermal-conductivity-type gas sensor based on the thermal conductivity of the gas is given priority and becomes dominant.

Therefore, due to the applied voltage of the thermistor 2p changing, for example, when the detection target gas has a low concentration of 1 ppm to 100 ppm, detection can be performed by functioning as the porous adsorption type gas sensor, and when the detection target gas has a high concentration of 100 ppm to several percent, detection can be performed by functioning as the thermal-conductivity-type gas sensor.

Such a gas detection method is a gas detection method of the porous adsorption type gas sensor 1 which includes the porous gas molecule adsorption material 3 that is thermally coupled to the thermistor 2p and desorbs specific gas molecules by heating and in which an excess power is supplied to the thermistor 2p to put the thermistor 2p in the thermal runaway state, wherein a function of detecting a gas by a reaction in which specific gas molecules are desorbed from the gas molecule adsorption material 3 and a function as the thermal-conductivity-type gas sensor that detects a gas according to the heat conductivity peculiar to the gas can be selected by changing the applied voltage of thermistor 2p.

As described above, in the gas detection device of the present embodiment, it is possible to provide the porous adsorption type gas sensor 1, the gas detection device, and the gas detection method, in which the concentration of the detection target gas can be detected with high sensitivity using the thermal runaway phenomenon of thermistor 2p, and the functions of both the thermal-conductivity-type gas sensor and the porous adsorption type gas sensor are selectively provided by changing the applied voltage of the thermistor 2p.

Other Embodiments

Another embodiment of the thermal-conductivity-type gas sensor and the gas detection device will be described with reference to FIGS. 23 to 27. Similar to each of the above embodiments, the thermistor is put in the thermal runaway state, and high sensitivity gas detection is performed. Further, the same or corresponding parts as those in each of the above embodiments are designated by the same reference numerals, and duplicate description will be omitted.

Example 1

Figure 23:
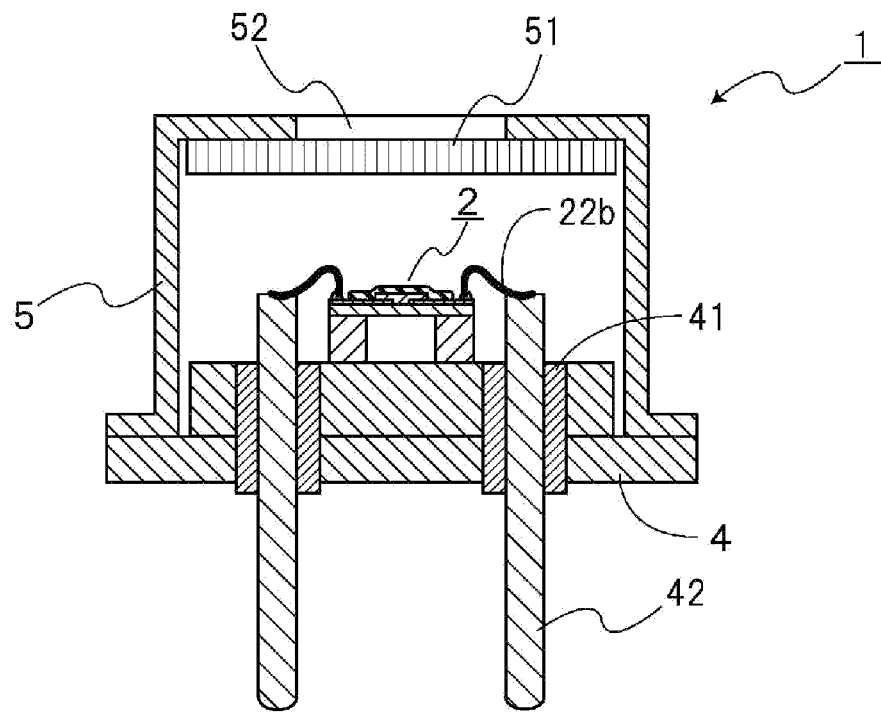
FIG. 23 is a cross-sectional view showing a thermal-conductivity-type gas sensor according to another embodiment (Example 1) of the present invention.
Figure 24:
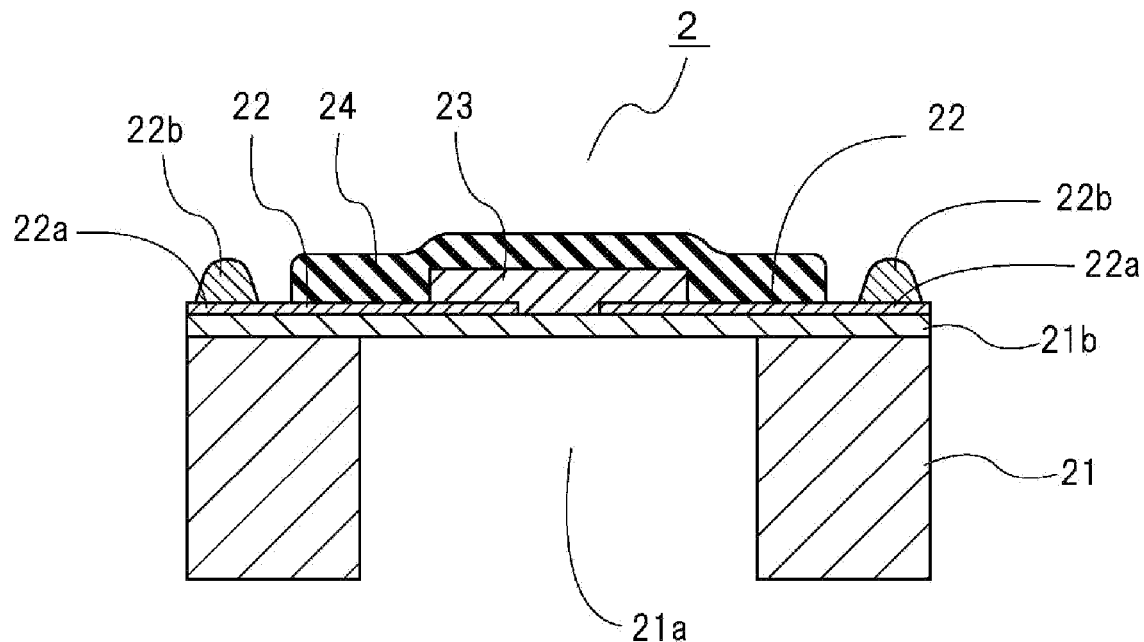
FIG. 24 is a cross-sectional view showing a thermistor according to Example 1.

The thermal-conductivity-type gas sensor 1 shown in FIGS. 23 and 24 is a gas sensor having a MEMS structure. A MEMS chip constituting the thermistor 2 is configured by providing a self-heatable thermistor 2 on an insulating film 21b formed on a hollow portion 21a of a silicon (Si) substrate 21.

According to the gas sensor 1 having such a MEMS structure, it is possible to realize a sensor with further reduction in power consumption and good responsiveness. It can be used optimally in a battery-powered gas detector.

Example 2

Figure 25:
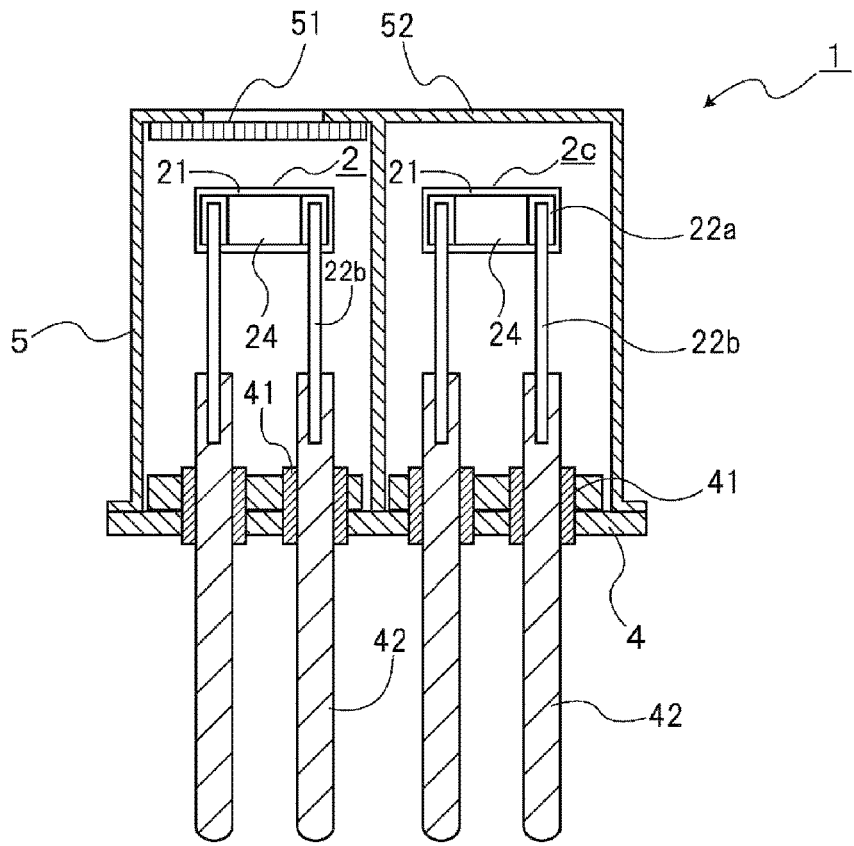
FIG. 25 is a cross-sectional view showing the thermal-conductivity-type gas sensor according to Example 2.
Figure 26:
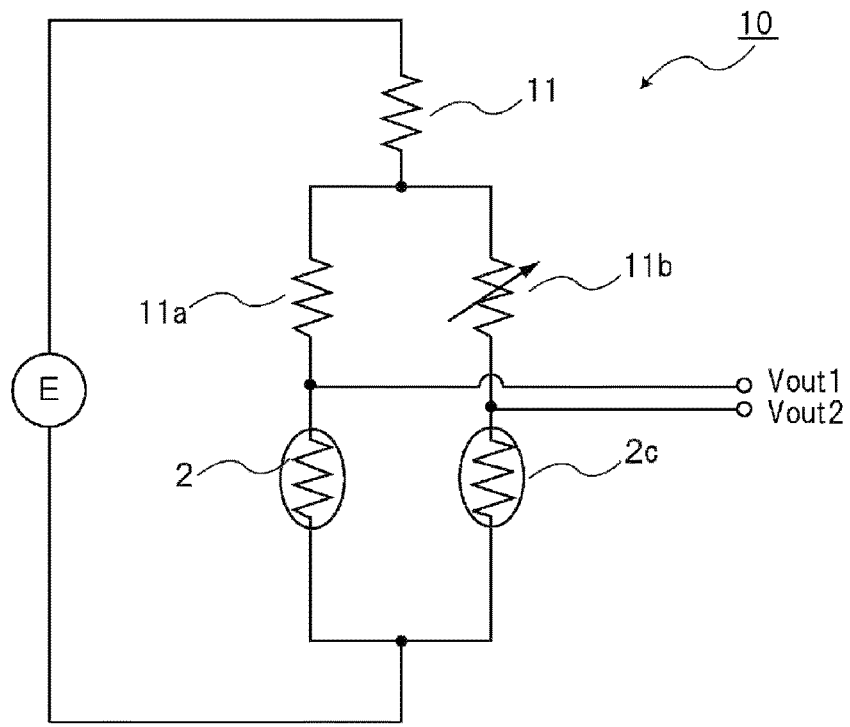
FIG. 26 is a wiring diagram for characteristic detection of the gas detection device according to Example 2.

FIG. 25 is a cross-sectional view showing a thermal-conductivity-type gas sensor, and FIG. 26 is a schematic connection diagram for characteristic detection of the gas detection device.

As shown in FIG. 25, the thermal-conductivity-type gas sensor 1 of the present embodiment includes a pair of thermistors. That is, a detection thermistor 2 and a compensation thermistor 2c are provided to be covered with the exterior case 5. Further, the compensating thermistor 2c side is sealed by the exterior case 5, and the compensating thermistor 2c is accommodated in this sealed space. Thus, since the detection thermistor 2 side and the compensation thermistor 2c side can have substantially the same configuration, and the compensation thermistor 2c is not affected by the detection target gas in the atmosphere, preferable temperature compensation can be realized, and highly accurate detection is possible.

As shown in FIG. 26, in the gas detection device 10, a power supply (a voltage source) E is connected to the thermal-conductivity-type gas sensor 1 to form a bridge circuit. A differential output between output voltages $V_{out}1$ and $V_{out}2$ can be detected.

A series circuit of the detection thermistor 2 and the fixed resistor 11a and a series circuit of the compensation thermistor 2c and a variable resistor 11b are connected in parallel to the power supply E via the limiting resistor 11. Further, an output terminal is connected in the middle of each of the series circuits so that the differential output can be detected as the output voltages $V_{out}1$ and $V_{out}2$. Therefore, the detection of the sensor voltage $V_{out}1$ as a voltage between electrodes of the detection thermistor 2 and the sensor voltage $V_{out}2$ as a voltage between electrodes of the compensation thermistor 2c is performed by the voltage detection unit described above.

The variable resistor 11b has a function of adjusting a bridge balance when there are variations in the resistance values of the detection thermistor 2 and the compensation thermistor 2c Example 3

Figure 27:
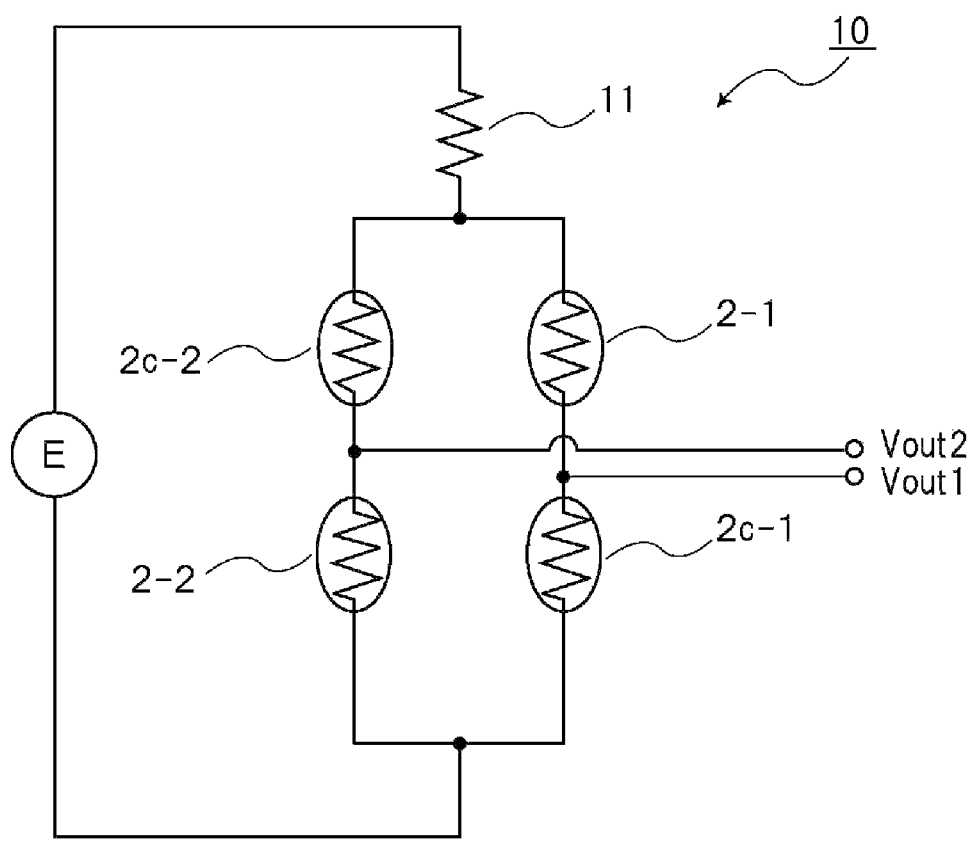
FIG. 27 is a wiring diagram for characteristic detection of the gas detection device according to Example 3.

FIG. 27 is a schematic wiring diagram for detecting characteristics of the gas detection device. As shown in FIG. 27, in the gas detection device 10, the power supply (the voltage source) E is connected to the thermal-conductivity-type gas sensor 1 to form a full bridge circuit. The differential output between the output voltages $V_{out}1$ and $V_{out}2$ can be detected.

A series circuit of a detection thermistor 2-1 and a compensation thermistor 2c-1 and a series circuit of a compensation thermistor 2c-2 and a detection thermistor 2-2 are connected in parallel to the power supply E via the limiting resistor 11. Further, the sensor voltage $V_{out}1$ and the sensor voltage $V_{out}2$ are detected by the voltage detection unit.

An output can be substantially doubled by configuring the full bridge circuit in this way, and the sensitivity can be further increased to enable highly accurate detection.

The gas sensor and the gas detection device of each of the above embodiments are not limited to the detection target gas, may detect hydrogen ($H_2$), water vapor (water molecule) ($H_2O$), helium (He), ammonia ($NH_3$), and the like, and can be provided and applied to various devices such as medical devices, automobiles, home appliances, OA devices, and food storage devices. The equipment to which it is specifically applied is not limited.

The present invention is not limited to the configuration of each of the above embodiments, and various modifications can be made without departing from the gist of the invention. Further, the above embodiments are presented as examples and are not intended to limit the scope of the invention. These novel embodiments can be implemented in the form of various other embodiments and can be omitted, replaced or modified in various ways. These embodiments and modifications thereof are included in the scope and gist of the invention and are also included in the scope of the invention described in the claims and the equivalent scope thereof.

What is claimed is:

1. A gas detection method of a thermal-conductivity-type gas sensor with a thermistor, comprising:
   a step of supplying an excess power to the thermistor to put the thermistor in a thermal runaway state; and
   a step of detecting a detection target gas with the thermistor in the thermal runaway state,
   wherein, in the step of supplying an excess power to the thermistor, a voltage corresponding to an atmospheric temperature is applied to the thermistor to make the thermal runaway state.

2. The gas detection method according to claim 1, wherein a step of keeping the thermal-conductivity-type gas sensor at a constant temperature is provided before the step of supplying an excess power to the thermistor.

3. The gas detection method according to claim 1, comprising a step of cooling the thermistor after the step of supplying an excess power to the thermistor,
   wherein an intermittent operation with a thermal runaway process and a cooling process as one cycle is allowed.

4. The gas detection method according to claim 1, wherein the detection target gas is detected by setting a detection time as an elapsed time from a start of detection.

5. The gas detection method according to claim 1, wherein, in an atmosphere in which the detection target gas and a plurality of gases other than the detection target gas are mixed, an operating temperature at which the thermistor is in the thermal runaway state is set to an atmospheric temperature in which thermal conductivities of the plurality of gases other than the detection target gas are substantially the same.

6. A gas detection method of a gas sensor which comprises a porous gas molecule adsorption material that is thermally coupled to a thermistor and desorbs specific gas molecules by heating, and which supplies an excess power to the thermistor to put the thermistor in a thermal runaway state, the gas detection method of a gas sensor comprising:

selecting a function of detecting a gas by a reaction of desorption of specific gas molecules from the gas molecule adsorbed material or a function as a thermal-conductivity-type gas sensor that detects a gas according to a heat conductivity peculiar to the gas by changing an applied voltage of the thermistor.

* * * * *